United States Patent
Vulkan et al.

(10) Patent No.: US 8,824,304 B2
(45) Date of Patent: Sep. 2, 2014

(54) REDUCING OVERHEAD ON VOICE TRAFFIC

(75) Inventors: Csaba Vulkan, Budapest (HU); Attila Rakos, Székesfehérvár (HU); Zoltan Vincze, Körmend (HU); Arpad Drozdy, Budapest (HU)

(73) Assignee: Nokia Solutions and Networks Oy, Espoo (FI)

( * ) Notice: Subject to any disclaimer, the term of this patent is extended or adjusted under 35 U.S.C. 154(b) by 121 days.

(21) Appl. No.: 13/634,421

(22) PCT Filed: Apr. 30, 2010

(86) PCT No.: PCT/EP2010/055901
§ 371 (c)(1),
(2), (4) Date: Sep. 12, 2012

(87) PCT Pub. No.: WO2011/134527
PCT Pub. Date: Nov. 3, 2011

(65) Prior Publication Data
US 2013/0003557 A1    Jan. 3, 2013

(51) Int. Cl.
*G06F 11/00* (2006.01)
*H04L 29/06* (2006.01)
(52) U.S. Cl.
CPC .............. *H04L 65/605* (2013.01); *H04L 65/80* (2013.01)
USPC ............................ 370/238; 370/252; 370/351
(58) Field of Classification Search
CPC ..... H04L 65/80; H04L 47/10; H04L 12/6418; H04L 1/0014; H04L 29/06027
USPC ....................................................... 370/238
See application file for complete search history.

(56) References Cited

U.S. PATENT DOCUMENTS

| | | |
|---|---|---|
| 6,920,125 B1 | 7/2005 | Wu |
| 6,993,021 B1 | 1/2006 | Chuah et al. |
| 7,330,460 B1 | 2/2008 | Hagirahim et al. |
| 7,496,086 B2 * | 2/2009 | Eckberg ........................ 370/352 |

(Continued)

FOREIGN PATENT DOCUMENTS

| | | |
|---|---|---|
| EP | 1677472 A1 | 7/2006 |
| JP | 2001-24703 A | 1/2001 |

(Continued)

OTHER PUBLICATIONS

International Search Report and Written Opinion dated Feb. 9, 2011 corresponding to International Patent Application No. PCT/EP2010/055901.

(Continued)

*Primary Examiner* — Anh-Vu Ly
*Assistant Examiner* — Deep A Belur
(74) *Attorney, Agent, or Firm* — Squire Patton Boggs (US) LLP

(57) ABSTRACT

The present invention provides a method, apparatus, gateway and a computer program product for reducing overhead on voice traffic within a packet based communication system. The present invention discloses collecting a plurality of packets to be multiplexed in an aggregated frame, measuring a number of received packets within a predetermined time period, and, if the number of received packets reaches a predetermined value, sending the aggregated frame including the collected packets.

18 Claims, 22 Drawing Sheets

(56) References Cited

U.S. PATENT DOCUMENTS

| | | | |
|---|---|---|---|
| 7,680,105 | B2 | 3/2010 | Mekala |
| 2003/0193950 | A1 | 10/2003 | Philips |
| 2006/0133372 | A1 | 6/2006 | Cheong et al. |
| 2008/0219262 | A1 | 9/2008 | Roay |
| 2009/0103504 | A1 | 4/2009 | Inumaru |
| 2009/0154475 | A1* | 6/2009 | Lautenschlaeger ........... 370/400 |
| 2010/0039957 | A1* | 2/2010 | Kotrla et al. ................. 370/253 |
| 2011/0019557 | A1* | 1/2011 | Hassan et al. ................. 370/252 |

FOREIGN PATENT DOCUMENTS

| | | |
|---|---|---|
| JP | 2001-308919 A | 11/2001 |
| JP | 2002-538727 A | 11/2002 |
| JP | 2009-105662 A | 5/2009 |

OTHER PUBLICATIONS

M. J. Lemke et al., "Alternative Backhaul Transport Techniques for VoIP and PTT in 1x EV-DO," Bell Labs Technical Journal, vol. 11, No. 4, 2007, pp. 273-289.

Hyogon Kim, et al., "Measurement-Based Multi-Call Voice Frame Grouping in Internet Telephony," IEEE Communications Letters, vol. 6, No. 5, May 2002, pp. 199-201.

H. P. Sze et al., "A Multiplexing Scheme for H.323 Voice-Over-IP Applications," IEEE Journal on Selected Areas in Communications, vol. 20, No. 7, Sep. 2002, pp. 1360-1368.

Barani Subbiah, et al., "RTP Payload Multiplexing Between IP Telephony Gateways," Global Telecommunications Conference—Globecom '99, Rio de Janeiro 1999, pp. 1121-1127.

R. Pazhyannur et al., "PPP Multiplexing," Network Working Group, RFC 3153, Aug. 2001, pp. 1-9.

ETSI TS 129 414 v8.3.0 (Apr. 2009), Technical Specification, Universal Mobile Telecommunications System (UMTS); LTE; Core network Nb Data Transport and Transport Signalling (3GPP TS 29.414 version 8.3.0 Release 8), Apr. 2009, pp. 1-30.

P. Cameron et al., "Transport Multiplexing Protocol (TMux)," Network Working Group, RFC 1692, Aug. 1994, pp. 1-12.

Abdelbasset Trad, et al., "Voice-TFCC: a TCP-Friendly Congestion Control Scheme for VoIP flows," Personal, Indoor and Mobile Radio Communications 2008, Sep. 15, 2008, XP031371737, pp. 1-5.

Rafael Mendes Pereira, et al., "Adaptive Multiplexing Based on E-Model for Reducing Network Overhead in Voice over IP Security Ensuring Conversation Quality," Digital Telecommunications, 2009, Jul. 20, 2009, XP031512961, pp. 53-58.

Arpad Drozdy, et al., "Bundling and Multiplexing in Packet Based Mobile Backhaul," Wireless Conference (EW), 2010 European, IEEE, Apr. 12, 2010, XP031688498, pp. 346-353.

Oscar Fresan et al., "Dynamic Packet Bundling for VoIP Transmission Over Rel'7 HSUPA with 10ms TTI Length," Wireless Communication Systems, 2007, Oct. 1, 2007, XP031166821, pp. 508-512.

Japanese Office Action, Notification of Reason for Rejection, application No. 2012-547461 dated Dec. 4, 2013.

* cited by examiner

Fig. 3

| Layer | Gn interface | | | S1-U interface | | |
|---|---|---|---|---|---|---|
| | Payload size (byte) | Overhead (byte) | SDU size (byte) | Payload size (byte) | Overhead (byte) | SDU size (byte) |
| AMR | - | - | 32 | - | - | 32 |
| RTP | 32 | 12 | 44 | 32 | 12 | 44 |
| UDP | 44 | 8 | 52 | 44 | 8 | 52 |
| IPv4 | 52 | 20 | 72 | 52 | 20 | 72 |
| GTP-U | 72 | 12 | 84 | 72 | 12 | 84 |
| UDP | 84 | 8 | 92 | 84 | 8 | 92 |
| IPv4 | 92 | 20 | 112 | 92 | w/o IPSec 20 / with IPSec (opt.) 53 | 112 / 145 |
| Ethernet | 112 | 30 | 142 | w/o IPSec 112 / with IPSec (opt.) 145 | 30 | 142 / 175 |

← 32 bytes useful data 110 bytes total overhead: 77% of the transport frame 110 (143) bytes total overhead: 77% (82%) of the transport frame

Fig. 5

| No. of included packets | Gn, S1-U (w/o IPSec) | | S1-U (with IPSec) | |
|---|---|---|---|---|
| | UDP multiplexing | IP multiplexing | UDP multiplexing | IP multiplexing |
| 2 | 17% | 15% | 23% | 21% |
| 3 | 24% | 21% | 32% | 29% |
| 4 | 27% | 24% | 36% | 33% |
| 5 | 29% | 25% | 39% | 36% |
| 10 | 33% | 29% | 44% | 40% |
| 15 | 35% | 30% | 46% | 42% |

REDUCING OVERHEAD ON VOICE TRAFFIC

FIELD OF THE INVENTION

Radio access technology is evolving towards fully packet based, flat architectural solutions in order to improve system capacity, increase end-user data rates and to reduce latency. The flat architecture and fully packet based technology is a cost efficient solution that further increases the competitiveness of the 3GPP technologies. The first evolutionary step is Internet High Speed Packet Access (I-HSPA) that streamlines the evolutional path from 3G systems to Long Term Evolution (LTE). I-HSPA is to phase out parallel circuit switched infrastructure and to operate as packet switched only, thus decreasing complexity and cost. In parallel with this evolution, the legacy 3G technology is also evolving to packet based transport with the support of an IP based transport layer in RU10 and later releases. However in 3G, at the service level, circuit switched services are not yet replaced by packet switched services.

The high rate, fully packet based radio access solutions enable the migration of the packet services well known from the internet to the mobile environment. In addition, in case of I-HSPA and LTE, the legacy circuit switched services are phased out by packet based services, for example, the voice service is using Voice over IP (VoIP) technology. The drawback of this is the high overhead on the payload: for example, an Adaptive Multi-Rate (AMR) 12.2 voice codec generates a 32 byte long data frame at each 20 ms during talk spurt, whereas the total overhead accumulated on the Gn interface connecting the I-HSPA base transceiver station (BTS) to the GGSN is at least 110 bytes assuming Ethernet transport. Similarly, the overhead is high in case of every connection or application that is generating small segments. The high overhead decreases the efficiency of the mobile backhaul in terms of bandwidth usage which is a significant issue in case of last mile links where the bandwidth is a limited resource. There are several alternative options on how the overhead can be mitigated without deteriorating the quality of service.

The present invention is preferably applicable to a mobile network scenario where user equipments (UEs) attached to the system via an I-HSPA Node B or an LTE eNodeB (eNB) are having a voice call (VoIP based) or are using any other application that generates small data packets. The user traffic is transferred between the I-HSPA BTS and the Gateway GPRS Support Node (GGSN) (I-HSPA Gateway (GW)) via the Gn-U interface (in case of I-HSPA) as shown on FIG. 1(a); or between the eNB and the S-GW via the S1 interface (in case of LTE) as shown on FIG. 1(b). The scope is to increase the system capacity in terms of number of served VoIP calls due to one of the following reasons: limited last mile link capacity, temporarily increased voice traffic intensity (load) or voice traffic demand under a smaller area. An alternative scope might be to increase the amount of bandwidth available for data traffic as the proposed solution does not deteriorate the quality of voice service (the additional delay introduced by multiplexing can be set to an arbitrarily low value).

Further, the present invention is also applicable to a mobile network scenario where the voice traffic of a connection in soft handover is forwarded between two I-HSPA Node Bs over the Iur interface (cf. FIG. 2).

The evolved radio access systems such as I-HSPA or LTE introduce fully packet based solutions where both the radio interface and the transport network is packet based. As mentioned above, in later releases of these systems the legacy circuit switched voice service is replaced by the VoIP technology. Even the user plane of the VoIP protocol stack (Real Time Transport Protocol (RTP)/User Datagram protocol (UDP)/Internet Protocol (IP)) adds overhead (40 bytes) which is comparable with the size of the voice frame to be transported between the two end points. The Gn-U-Iur or the S1-X2 protocol stack further increases the overhead, this deteriorates the system efficiency especially in case of bandwidth limited last mile links, as illustrated in the table shown in FIG. 3.

In case of soft handovers, the transport overhead is further increased due to the forwarded traffic over the Iur interface (cf. FIG. 3). The forwarded traffic increases the load on each link through which it is routed and competes with the MDC combined traffic for the resources of the capacity limited last mile links or on other links as well depending on the topology and the transport services. For example, in case the mobile backhaul is realized with Carrier Ethernet E-Line services, the handover traffic is forwarded up to the first router which can be a backbone router or the site router at the I-HSPA GW. Similarly in case of E-LAN services, the handover traffic is forwarded through the Virtual Switch Instances (VSIs) of the aggregation domain. The links connecting the I-HSPA BTS to the router or to the VSI are all shared by traffic forwarded over the Iur and Gn-u interfaces.

The result is that evolved systems are able to serve less voice connections over the same link than a legacy 3G system or the high priority voice traffic leaves less capacity for the background traffic. Obviously, this efficiency problem may also appear in case of other applications or services that communicate by sending small sized packets.

The efficiency of the system can be improved by reducing the overhead on small packets such as VoIP packets with multiplexing (aggregation of small voice packets belonging to different VoIP connections to the same transport frame).

The amount of resources (bandwidth) required to serve a single VoIP connection can be significantly decreased with multiplexing: voice packets of different VoIP connections are transmitted in one transport frame enabling the shared use of several transport protocol headers, thus reducing the transport overhead, as illustrated in the table shown in FIG. 5. The table of FIG. 5 shows the achievable multiplexing gain in function of the number of packets multiplexed together when the multiplexing is done at the UDP or at IP layer of the Gn-U and S1-U protocol layers. In case of mobile backhaul, where real time services are having strict delay requirements and where the end devices are changing their point of attachment during the connection lifetime (due to mobility and handovers), special multiplexing solutions are required.

The efficiency of the multiplexing can be increased by delaying the aggregated frame longer in order to increase the amount of aggregated voice packets. The maximum number of aggregated voice packets is given by the maximum transfer unit (MTU) size (in case of Ethernet the MTU is 1500 bytes), however in some cases there is no point in delaying the aggregated frame until the aggregated frame is full (the maximum allowed number of aggregated voice packets is reached). Adaptive multiplexing solutions can be applied that estimate the optimal amount of voice packets to be integrated into one aggregated frame.

The additional delay introduced by the multiplexing might result in quality degradation, thus there is trade-off between the quality of service offered to voice connections and the bandwidth gain.

The operation of the multiplexer is not the only factor that causes quality degradation. It is also influenced by the actual state (load, congestion) of the transport network. The overall network performance can be increased by adaptive multiplexing when the multiplexer adapts its operation to the detected load, end-to-end delay, and congestion.

For example, in high load cases, the data connections might experience increased end-to-end delay due to the congestion. This can be mitigated by increasing the multiplexing gain (increasing the number of connections that are multiplexed together). An additional example is the case when the voice connections served by a given BTS are experiencing delay increase, which is a situation that requires that the multiplexing is not performed in order to reduce the total delay.

BACKGROUND OF THE INVENTION

Several conference papers and patents address the issue of decreasing the protocol overhead of the transmission of small sized voice packets in IP based packet networks by proposing multiplexing solutions.

According to the known solution, for example, document US 2006/0120347 A1 proposes multiplexing in the transport layer for general IP based networks and document US2006/0133372 A1 proposes similar UDP based multiplexing schemes for mobile networks. The multiplexing can also be executed in the IP protocol of the network layer as proposed by document U.S. Pat. No. 6,920,125 B1 for mobile networks and by document "Transport Multiplexing Protocol (TMux)" by P. Cameron et al, RFC 1692, August 1994, for general IP based networks. Further, document "RTP payload multiplexing between IP telephony gateways" by B. Subbiah et al, Globecom '99, pp. 1121-1127, Rio de Janeiro 1999, proposes a multiplexing solution operating in the RTP layer for IP telephony gateways.

These solutions are common in the sense that they propose non-adaptive multiplexing operation, i.e., the number of maximum multiplexed packets are determined on a-priori given thresholds (waiting time/number of packets threshold) and the actual network state does not influence the operation.

Further, adaptive multiplexing solutions for the adaptive setting of multiplexing parameters are proposed in documents US 2009/0103504 A1, document "Adaptive Multiplexing Based on E-model for Reducing Network Overhead in Voice over IP Security Ensuring Conversation Quality" by R. M. Pereira et al, 2009 Fourth International Conference on Digital Telecommunications, pp. 53-58, Colmar, France, 2009, ISBN: 978-0-7695-3695-8, document "Measurement-Based Multi-Call Voice Frame Grouping in Internet Telephony" by H. Kim et al, IEEE Communications Letters, vol. 6, no. 5, May 2002, and document "Voice-TFCC: A TCP-Friendly Congestion Control Scheme for VoIP Flows" by A. Trad et al, PIMRC 2008, 15-18 Sep. 2008, Cannes, France. Pereira, Kim and Trad consider multiplexing in a general IP based network while document US 2009/0103504 A1 assumes an LTE communication network. Document US 2009/0103504 A1 proposes to set the maximum number of multiplexed packets according to the remaining storage capacity of the reception buffer. This solution uses a static timer value, thus the delay added by the multiplexing cannot be adapted to the actual network state.

Pereira proposes to set the multiplexing timer value according to the quality of the voice calls. This needs the evaluation of the voice calls individually. Due to complexity concerns this solution is hardly applicable in telecommunication systems.

According to Kim, the value of the multiplex timer is determined from the measured mouth to ear delay. The delay is predicted from the measurements using the retransmission timeout calculation algorithm of the Transport Control Protocol (TCP) in order to temper the variation of the predicted mouth to ear delay. In a mobile communication network the significant part of the mouth to ear delay can be the air interface delay, thus the application of this solution would need the measurement of the delay of each connection that is not feasible due to complexity issues.

Moreover, Trad proposes to set the number of multiplexed voice calls according to a TCP friendly rate setting formula. This solution varies only the number of multiplexed voice calls and uses a fixed multiplex timer, thus it cannot minimize the added delay.

Hence, the above mentioned solutions are operating based on the information from the receiving entity on the quality of the connection. In contrast thereto, the solution according to embodiments of the present invention to be described later operate based only on information that is available at the multiplexer entity side.

SUMMARY OF THE INVENTION

According to the present invention, there is proposed a solution that is based on adaptive aggregation of the small voice packets from separate VoIP connections in larger transport frames. The aggregation is referred to as multiplexing.

The invention proposes adaptive multiplexing of VoIP frames over Gn and S1 interface in order to reduce the transport overhead and increase the system capacity.

The solution preferably operates in a packet based mobile backhaul network (I-HSPA, LTE) environment and the multiplexing is carried out dynamically adapting to the actual traffic mix and to the state of the mobile backhaul network.

Although the embodiments of the present invention are described with reference to mobile communication networks, it is noted that the present invention is not limited to mobile communication networks, but that the present invention is also applicable to any kind of wired packet based networks.

The solution is applicable for any traffic that generates small packets, however in this document only the multiplexing of VoIP packets is discussed in detail, as an example only. This can be extended to other applications as well.

According to the present invention, there are provided a method, apparatus, gateway and computer program product for reducing an overhead on voice traffic.

According to an aspect of the invention there is provided a method comprising:
  collecting a plurality of packets to be multiplexed in an aggregated frame,
measuring a number of received packets within a predetermined time period, and
  if the number of received packets reaches a predetermined value,
  sending the aggregated frame including the collected packets.

According to another aspect of the invention there is provided a method comprising:
  collecting a plurality of packets to be multiplexed in an aggregated frame,
  setting a maximum allowed waiting time of a packet in a multiplexing buffer,
  measuring a number of received packets within a predetermined time period and a waiting time of a first packet in the multiplexing buffer, and
  if the number of received packets reaches a predetermined value or if the waiting time of the first packet reaches the maximum allowed waiting time,
  sending the aggregated frame including the collected packets.

According to further refinements of the invention as defined under the above aspects, the method further comprises, detecting an average number of multiplexed packets sent in an aggregated frame, deciding, upon arrival of each further packet after the number of packets to be multiplexed reaches the measured average number, whether to send the aggregated frame based on a probability distribution function.

According to another aspect of the invention there is provided a method comprising:

collecting a plurality of packets to be multiplexed in an aggregated frame, dividing a predetermined time period into a plurality of equal intervals, measuring a number of received packets within each of the plurality of intervals, and when the measured number of received packets exceeds a predetermined value, sending the aggregated frame including the collected packets.

According to further refinements of the invention as defined under the above aspects, the method further comprises setting a timer at the arrival of the first packet to a predetermined value, and when the measured number of received packets exceeds a predetermined value or the timer expires, sending the aggregated frame including the collected packets;

predicting a number of packets to be received within each of a plurality of intervals of a next predetermined time period based on the measured number of received packets within each of the plurality of intervals in the previous predetermined time period, determining in which of the plurality of intervals of the next predetermined period the timer expires, detecting whether the predicted number of packets to be received in the determined interval is zero, wherein if the predicted number of packets is zero, repeating the detecting for the interval previous to the determined interval until an interval is determined in which the predicted number of packets to be received is other than zero, and then defining the timer as the time up to the end of the interval in which the predicted number of packets is other than zero.

According to another aspect of the invention there is provided an apparatus comprising:

a collecting unit configured to collect a plurality of packets to be multiplexed in an aggregated frame, a measuring unit configured to measure a number of received packets within a predetermined time period, and a sending unit configured to send, if the number of received packets reaches a predetermined value, the aggregated frame including the collected packets.

According to another aspect of the invention there is provided an apparatus comprising:

a collecting unit configured to collect a plurality of packets to be multiplexed in an aggregated frame, a setting unit configured to set a maximum allowed waiting time of a packet in a multiplexing buffer, a measuring unit configured to measure a number of received packets within a predetermined time period and a waiting time of a first packet in the multiplexing buffer, and a sending unit configured to send, if the number of received packets reaches a predetermined value or if the waiting time of the first packet reaches the maximum allowed waiting time, the aggregated frame including the collected packets.

According to further refinements of the invention as defined under the above aspects, the apparatus further comprises a detecting unit configured to detect an average number of multiplexed packets sent in an aggregated frame, a deciding unit configured to decide, upon arrival of each further packet after the number of packets to be multiplexed reaches the measured average number, whether to send the aggregated frame based on a probability distribution function.

According to another aspect of the invention there is provided an apparatus comprising:

a collecting unit configured to collect a plurality of packets to be multiplexed in an aggregated frame, a dividing unit configured to divide a predetermined time period into a plurality of equal intervals, a measuring unit configured to measure a number of received packets within each of the plurality of intervals, a sending unit configured to send, when the measured number of received packets exceeds a predetermined value, the aggregated frame including the collected packets.

According to further refinements of the invention as defined under the above aspects, the apparatus further comprises a setting unit configured to set a timer at the arrival of the first packet to a predetermined value, wherein the sending unit is further configured to send the aggregated frame including the collected packets, when the measured number of received packets exceeds a predetermined value or the timer expires;

a predicting unit configured to predict a number of packets to be received within each of a plurality of intervals of a next predetermined time period based on the measured number of received packets within each of the plurality of intervals in the previous predetermined time period, a determining unit configured to determine in which of the plurality of intervals of the next predetermined period the timer expires, a detecting unit configured to detect whether the predicted number of packets to be received in the determined interval is zero, wherein if the predicted number of packets is zero, the operation of the detecting unit is repeated for the interval previous to the determined interval until an interval is determined in which the predicted number of packets to be received is other than zero, and a defining unit configured to define the timer as the time up to the end of the interval in which the predicted number of packets is other than zero.

According to another aspect of the invention there is provided a gateway comprising:

an apparatus as defined above, a congestion detecting unit configured to detect a congestion, a delay measurement unit configured to measure a delay of a connection between the gateway and a base station, an estimating unit configured to estimate, if congestion is detected, a delay of the connection between the gateway and the base station when the apparatus is turned on, a calculating unit configured to calculate, if congestion is detected, a bandwidth gain, a comparing unit configured to compare the estimated delay with the measured delay or with a first predetermined threshold and to compare the bandwidth gain with a second predetermined threshold, and an activating unit configured to activate the apparatus, if the estimated delay is lower than the measured delay or the first predetermined threshold and the bandwidth gain is above the second predetermined threshold.

According to a still further aspect of the invention there is provided a computer program product including a program for a processing device, comprising software code portions for performing the steps of the methods as defined above when the program is run on the processing device.

According to a still further aspect of the invention there is provided a computer program product as defined above, wherein the computer program product comprises a computer-readable medium on which the software code portions are stored.

According to a still further aspect of the invention there is provided a computer program product as defined above, wherein the program is directly loadable into an internal memory of the processing device.

According to another aspect of the invention there is provided an apparatus comprising:
 collecting means for collecting a plurality of packets to be multiplexed in an aggregated frame,
 measuring means for measuring a number of received packets within a predetermined time period, and
 sending means for sending, if the number of received packets reaches a predetermined value, the aggregated frame including the collected packets.

According to another aspect of the invention there is provided an apparatus comprising:
 collecting means for collecting a plurality of packets to be multiplexed in an aggregated frame,
 setting means for setting a maximum allowed waiting time of a packet in a multiplexing buffer,
 measuring means for measuring a number of received packets within a predetermined time period and a waiting time of a first packet in the multiplexing buffer, and
 sending means for sending, if the number of received packets reaches a predetermined value or if the waiting time of the first packet reaches the maximum allowed waiting time, the aggregated frame including the collected packets.

According to another aspect of the invention there is provided an apparatus comprising:
 collecting means for collecting a plurality of packets to be multiplexed in an aggregated frame,
 dividing means for dividing a predetermined time period into a plurality of equal intervals,
  measuring means for measuring a number of received packets within each of the plurality of intervals, and
  sending means for sending, when the measured number of received packets exceeds a predetermined value, the aggregated frame including the collected packets.

According to another aspect of the invention there is provided a gateway comprising:
 an apparatus as defined above,
 congestion detecting means for detecting a congestion,
 delay measurement means for measuring a delay of a connection between the gateway and a base station,
 estimating means for estimating, if congestion is detected, a delay of the connection between the gateway and the base station when the apparatus is turned on,
 calculating means for calculating, if congestion is detected, a bandwidth gain,
 comparing means for comparing the estimated delay with the measured delay or with a first predetermined threshold and to compare the bandwidth gain with a second predetermined threshold, and
 activating means for activating the apparatus, if the estimated delay is lower than the measured delay or the first predetermined threshold and the bandwidth gain is above the second predetermined threshold.

BRIEF DESCRIPTION OF THE DRAWINGS

These and other objects, features, details and advantages will become more fully apparent from the following detailed description of embodiments of the present invention which is to be taken in conjunction with the appended drawings, in which:

FIG. 3 is a table indicating transport overheads;

FIG. 5 is a table indicating multiplexing bandwidth gain;

DETAILED DESCRIPTION

Figure 1:
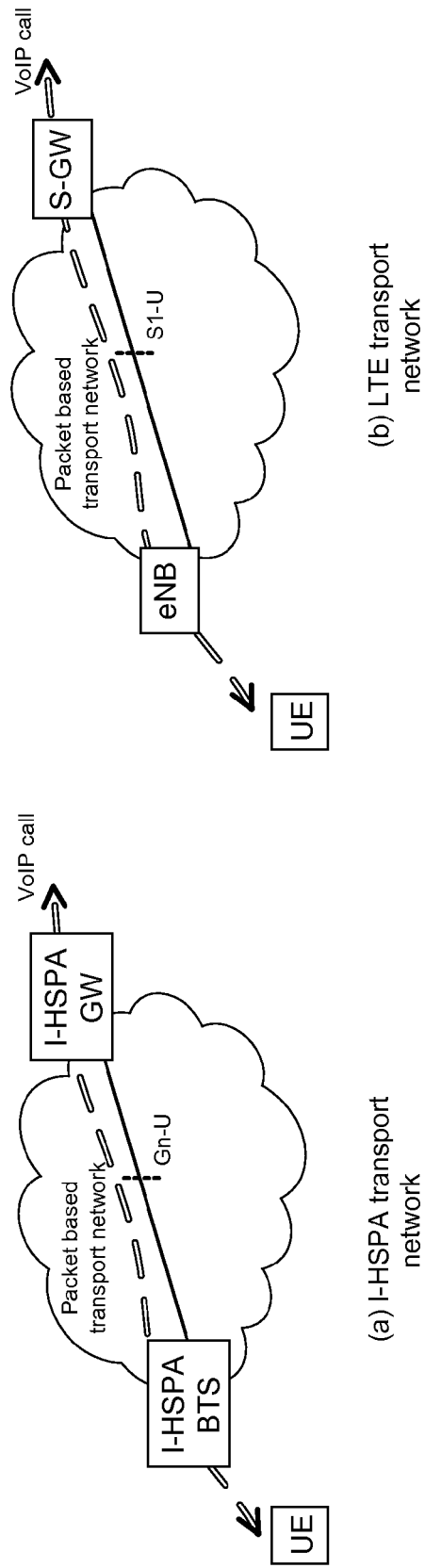
FIGS. 1(a) and (b) are overviews illustrating a VoIP call over I-HSPA and LTE transport networks, respectively.
Figure 2:
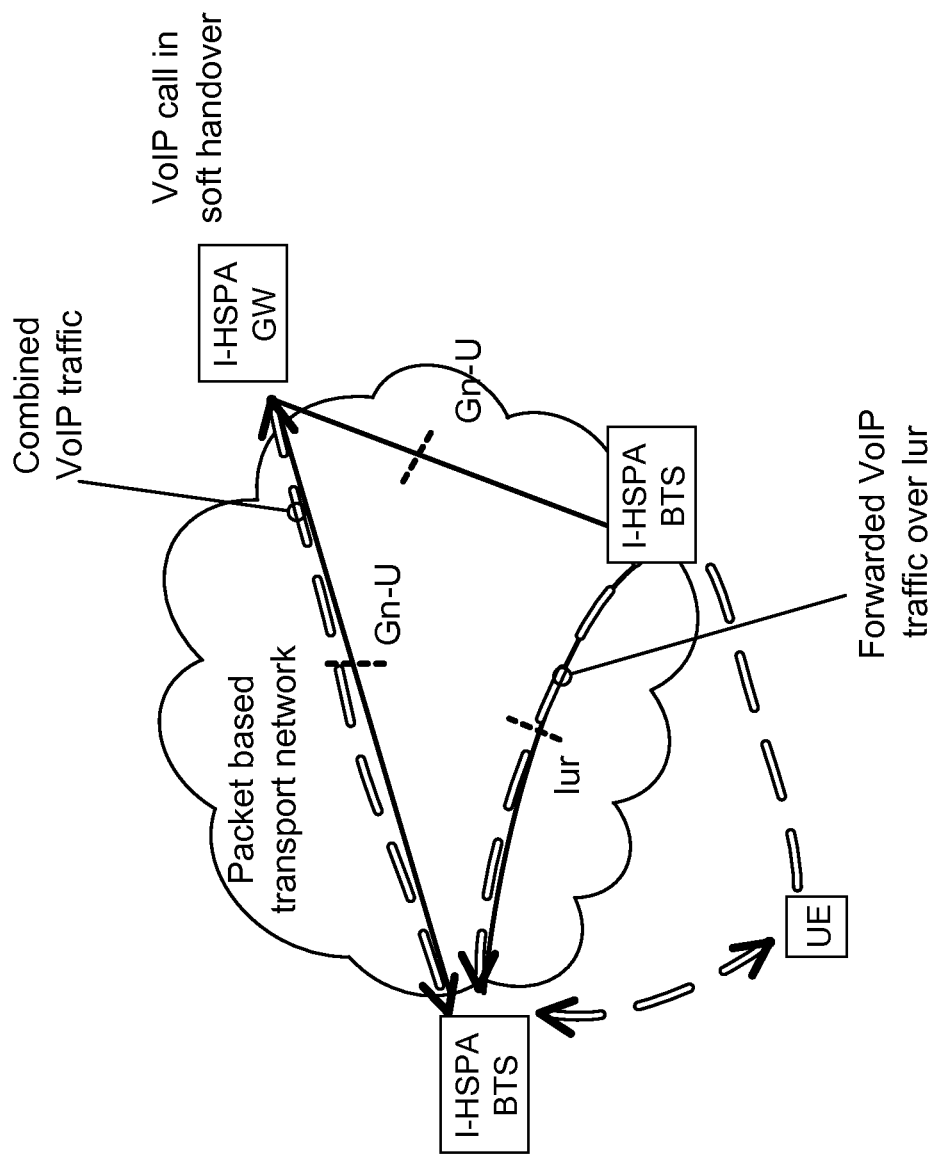
FIG. 2 is an overview illustrating a VoIP call in soft handover over an I-HSPA transport network.
Figure 4:
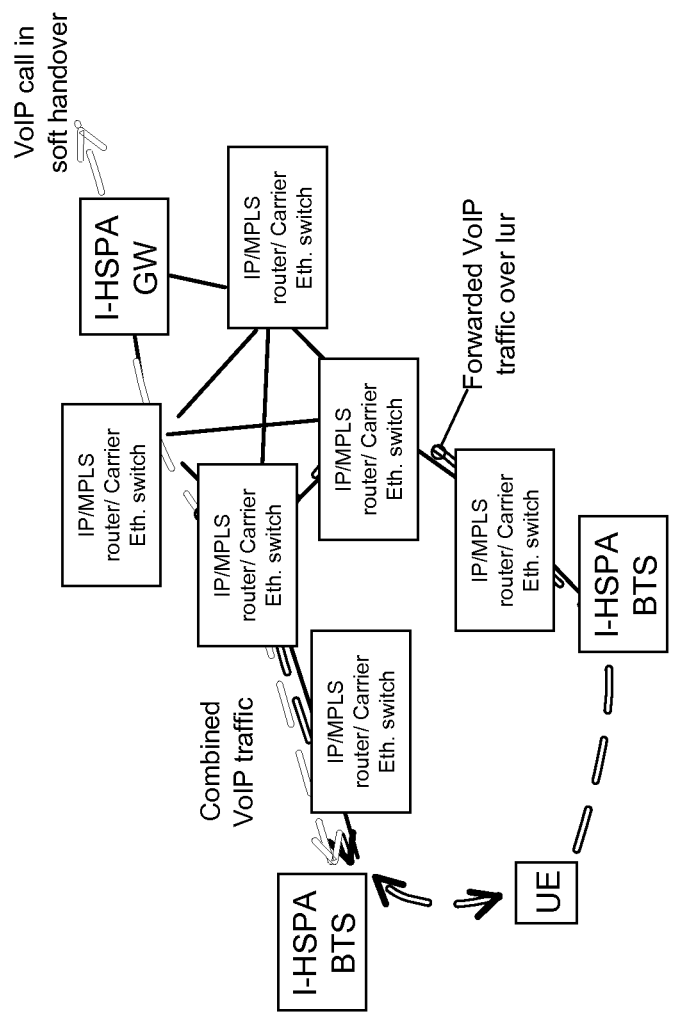
FIG. 4 is an overview illustrating forwarded VoIP traffic in case of a soft handover over the transport topology.

In the following, embodiments of the present invention are described by referring to general and specific examples of the embodiments. It is to be understood, however, that the description is given by way of example only, and that the described embodiments are by no means to be understood as limiting the present invention thereto.

According to an embodiment of the present invention, there is proposed a solution that operates in a packet based mobile backhaul network (I-HSPA, LTE) environment and the multiplexing is carried out dynamically adapting to the actual traffic mix and to the state of the mobile backhaul network. The report introduces a multiplexing/de-multiplexing point at the GW node (I-HSPA GW or S-GW) that is multiplexing/de-multiplexing the VoIP traffic sent to/from the I-HSPA BTS over the Gn-U interface or to the eNB over the S1-U (LTE) interface. Similarly a multiplexing/de-multiplexing point is introduced at the I-HSPA BTS or eNB that is multiplexing/de-multiplexing the VoIP traffic sent to/from the I-HSPA GW or S-GW over the Gn-U or S1-U interface. Additionally, in case of I-HSPA BTSs a multiplexing entity is implemented that multiplexes the VoIP traffic sent to other I-HSPA BTSs over the Iur interfaces. These nodes are good locations for the proposed functionalities as they are in control of the whole traffic sent over the Gn-U, S1-U or Iur interfaces.

According to an embodiment of the present invention, there is proposed a multiplexing/de-multiplexing entity that is located in the I-HSPA GW or in S-GW.

In one aspect of the embodiment, there is one entity implemented for each Gn-U or S1-U interface. The multiplexer evaluates the VoIP traffic sent to the I-HSPA BTS/eNB over the Gn-U/S1-U interface and defines the amount of the multiplexed VoIP packets or it adjusts the multiplexing timer according to the result of the evaluation.

Alternatively or additionally the multiplexing/de-multiplexing entity communicates with the Downlink Call Admission Control (DL CAC) and in case the amount of VoIP calls is increasing (the traffic intensity is increasing) above the amount of calls the system is able to serve without multiplexing, the multiplexing/de-multiplexing is turned on and the CAC is informed about the changed (decreased) amount of bandwidth that has to be reserved for each VoIP call, this makes the admission and serving of additional VoIP calls possible.

Further, alternatively or additionally the multiplexing/de-multiplexing entity performs delay measurements for the VoIP traffic and congestion detection for lower priority traffic. In case congestion is detected, the multiplexing/de-multiplexing entity evaluates the impact of multiplexing on the quality of the VoIP service by considering the delay measurements as reference. In case the evaluation gives positive results, i.e. the estimated delay is not increasing above a predefined threshold, the multiplexing is turned on for each interface that shares transport links with the interface for which congestion has been measured.

According to another embodiment of the present invention, there is proposed a multiplexing/de-multiplexing entity that is located in the I-HSPA BTS or in the eNB.

In one aspect of this embodiment, the enhanced multiplexing functionality is implemented only at the I-HSPA GW or S-GW whereas the I-HSPA BTS or eNB has a simpler entity implemented at the I-HSPA BTS or eNB that monitors the amount of VoIP packets within one transport frame received from the I-HSPA GW or S-GW via the Gn-U or S1-U interface and uses this value to multiplex the Uplink (UL) voice traffic.

Alternatively the multiplexer evaluates the VoIP traffic sent to the I-HSPA GW/S-GW over the Gn-U/S1-U interface and defines the number of VoIP packets to be in one multiplex according to the result of the evaluation.

Alternatively or additionally the multiplexing/de-multiplexing entity communicates with the UL CAC and in case the amount of VoIP calls is increasing (the traffic intensity is increasing) above the amount of calls the system is able to serve without multiplexing, the multiplexing/de-multiplexing is turned on and the CAC is informed about the changed (decreased) amount of bandwidth that has to be reserved for each VoIP call, that makes the admission and serving of additional VoIP calls possible.

Alternatively or additionally the multiplexing/de-multiplexing entity performs delay measurements for the VoIP traffic and congestion detection for lower priority traffic. In case congestion is detected the multiplexing/de-multiplexing entity evaluates the impact of multiplexing on the quality of the VoIP service by considering the delay measurements as reference. In case the evaluation gives positive results, i.e. the estimated delay is not increasing above a predefined threshold, the multiplexing is turned on.

Additionally a multiplexing/de-multiplexing entity is implemented for each Iur interface which evaluates the VoIP traffic sent over the Iur interface and defines the number of VoIP packets to be in one multiplex according to the result of the evaluation. Alternatively the multiplexing can be turned on only in case increased voice load is detected.

In the following, an example of an implementation of an embodiment of the present invention will be described with reference to an I-HSPA system and a LTE system.

According to the example of the implementation, in an I-HSPA system, there are provided mobile users performing voice calls, an I-HSPA GW and I-HSPA BTSs. In case of a LTE system, there are provided mobile users performing voice calls, an S-GW and eNBs.

Figure 6:
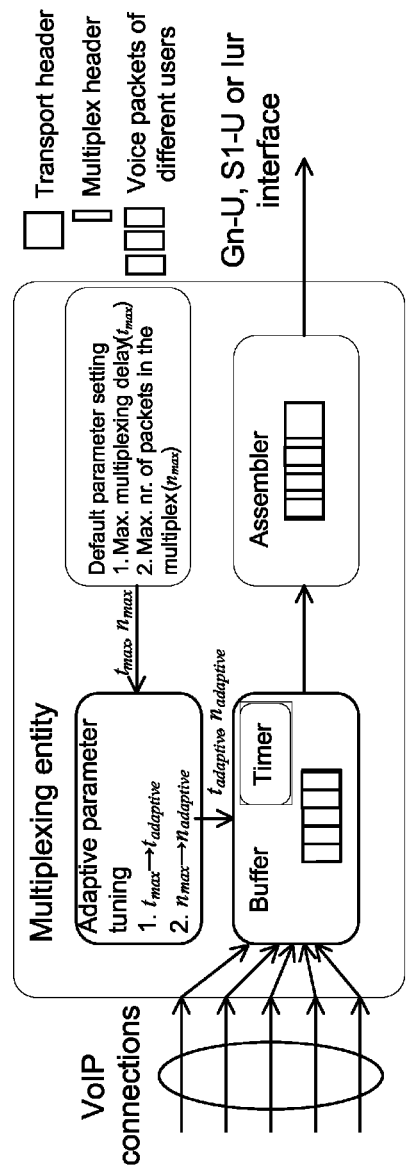
FIG. 6 is a diagram illustrating an example of a multiplexing entity according to an aspect of the present invention.
Figure 7:
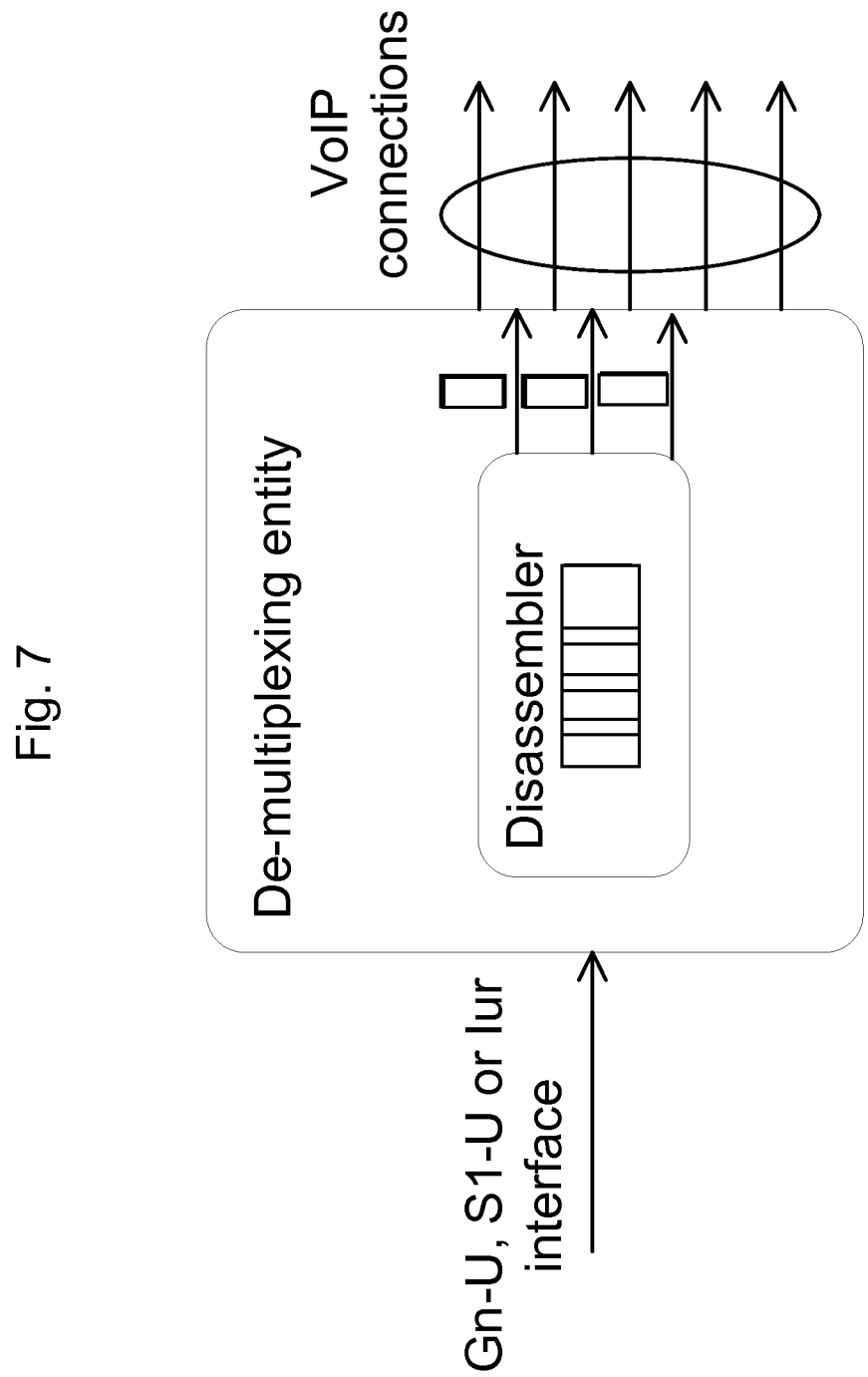
FIG. 7 is a diagram illustrating an example of a de-multiplexing entity according to an aspect of the present invention.

A multiplexing/de-multiplexing entity can be a software component running on or attached to an I-HSPA GW (S-GW) and with a peering entity running on or attached to the I-HSPA BTSs (eNBs) that are connected to the I-HSPA GW (S-GW) via Gn-U (S1-U) interfaces (cf. FIG. 6 and FIG. 7). At the I-HSPA GW (S-GW) there is a separate instance of the multiplexing/de-multiplexing entity for each Gn-U (S1-U) interface. In DL, the multiplexing is performed at the I-HSPA GW or S-GW and the de-multiplexing at the I-HSPA BTS or the eNB whereas in UL the multiplexing is done at the I-HSPA BTS (eNB) and the de-multiplexing is performed at the I-HSPA GW (S-GW).

Additionally, at the I-HSPA BTSs multiplexing/de-multiplexing entities can be implemented for each Iur interface. In this case the multiplexing/de-multiplexing is performed at the peering entities that have Iur traffic. The multiplexing/de-multiplexing entity observes the VoIP traffic and performs the multiplexing according to the measurements, to be described later.

Additionally the multiplexing/de-multiplexing entity communicates with the CAC and decides to switch the multiplexing on or off depending on the received information on traffic intensity, to be described later.

Additionally or alternatively the multiplexing entity performs delay and congestion measurements with a measurement loop, for example using the Bidirectional Forwarding Detection protocol (BFD) that is designed for link failure detection and can also be used for delay measurement purposes. One BFD session should be assigned to the VoIP traffic, while the second session should be assigned to low and medium priority traffic (e.g., data traffic, etc.). By monitoring the difference in the measurement results the network link quality can be assessed much more precisely without knowing any absolute details about the transport network. In case congestion is detected, the multiplexing entity switches the multiplexing on, as described later in detail. The I-HSPA BTS or eNB side realisation of the multiplexing entity may have only a limited implementation i.e. it can set the multiplexing parameters based on the observed multiplexing parameters extracted from the received packets over the Gn-U or S1-U interface.

Multiplexing can be implemented in different protocol layers and the higher the layer is in the protocol stack, the higher is the achievable gain.

As already mentioned above, multiplexing in the RTP protocol of the application layer was proposed by Subbiah et al. However, as there is no standard defining it and the realization of RTP level aggregation would need to terminate the original RTP sessions and setup new ones in the I-HSPA GW (S-GW) and in the I-HSPA BTS (eNB) which would introduce high added complexity and scalability issues, the use of this solution in I-HSPA and LTE systems is not feasible.

Figure 8:
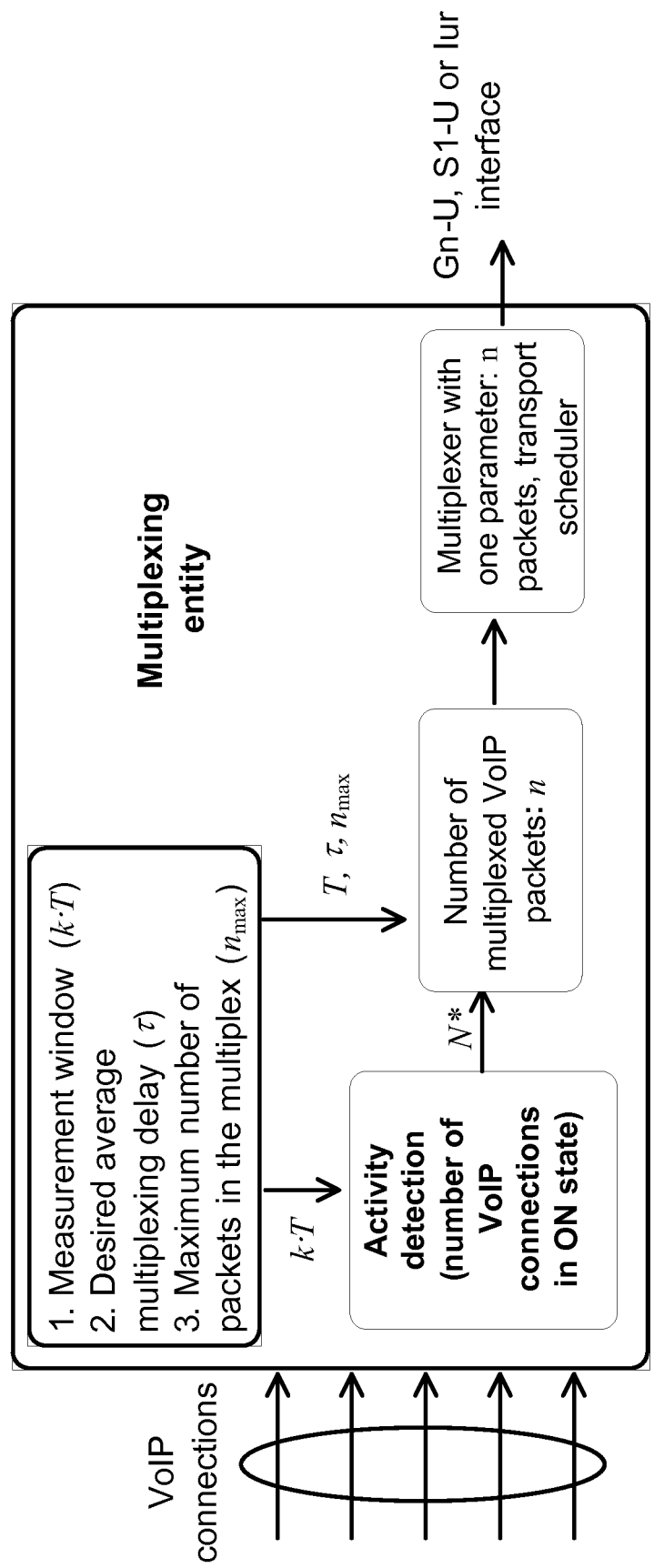
FIG. 8 is a diagram illustrating an example of a multiplexing entity according to an aspect of the present invention.

FIG. 8 shows an example of a multiplexer of a multiplexing/de-multiplexing entity according to an embodiment of the present invention. Here, the de-multiplexing entity is implemented according to FIG. 7. The multiplexer as shown in FIG. 8 estimates the amount of connections in ON state, and defines the number of VoIP packets multiplexed together based on the result of the estimation. In this case the multiplexing timer is not required, or if it is implemented it is used for security reasons, i.e., to prevent extensive delay. The estimation is done by measuring the amount of received VoIP packets over a k·T measurement window, where k is a parameter that takes positive integer values, whereas T is the VoIP packet inter-arrival time (e.g., 20 ms in case of AMR codec).

The measured VoIP packet arrivals (x) during the measurement window gives the number of connections in ON state (N*).

$$N^* = \frac{x}{k}, k \in \mathbb{N}$$

If k=1, then each connection in ON state will have one packet arrival within the observation window, since a VoIP codec generates a speech frame regularly with a period of T, thus the amount of connections in ON is estimated. If k is set to higher than one, then the result is similar, inaccuracies due to jitter are proportionally less, but inaccuracies due to talk spurts starting and ending increase. K·T is to be kept much lower than the average length of a talk spurt (which is a couple of seconds).

Let τ denote the desired average delay. A multiplexed frame is to be aggregated and sent out when the number of packets (from different VoIP sources) collected by the multiplexer to be multiplexed into one aggregated frame reaches n, which is to be linearly proportional to the number of active connections in the system.

$$n = \frac{\tau}{T} \cdot N^*, 0 < \tau \leq T$$

This ensures that the average delay introduced by the multiplexing remains roughly independent of the number of active connections. Furthermore, if the equation determines n to be greater than the maximum allowed number of multiplexed VoIP packets ($n_{max}$) is to be equal to $n_{max}$ ($n \leq n_{max}$).

Thus, the multiplexer has two parameters which are the maximum number of packets in the multiplex ($n_{max}$) and the maximum allowed waiting time of a VoIP packet in the multiplexing buffer ($t_{max}$). If either the number of VoIP packets in the buffer exceeds $n_{max}$ or the waiting time of the first packet reaches $t_{max}$, the aggregated frame is sent out. Alternative implementations of the multiplexing entity use both or only one of these two parameters. The value of these parameters is also implementation specific.

The de-multiplexer at the peering entity just strips down the transport frame and multiplexing headers and delivers each VoIP packet to the corresponding destination.

Figure 9:
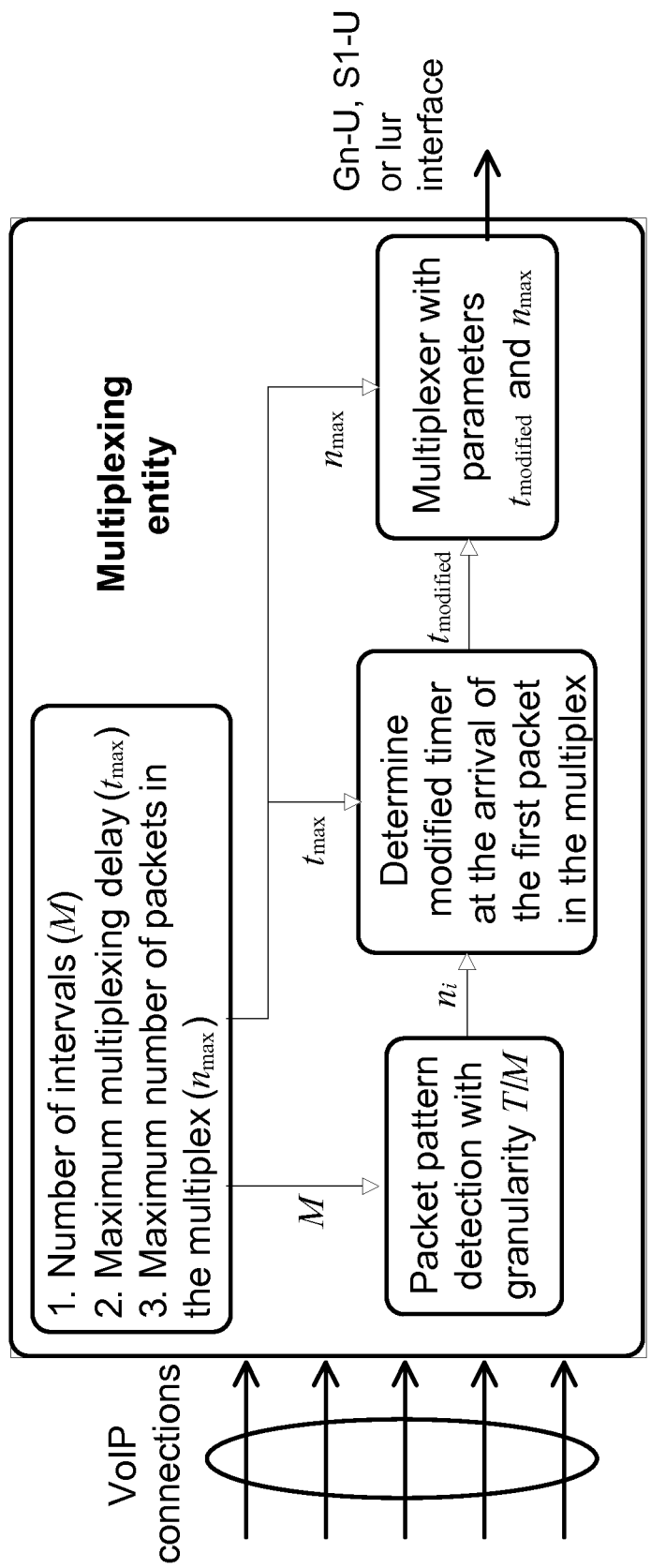
FIG. 9 is a diagram illustrating an example of a multiplexing entity according to an aspect of the present invention.

FIG. 9 shows a further example of a multiplexer of a multiplexing/de-multiplexing entity according to an embodiment of the present invention. Here, the de-multiplexing entity is implemented according to FIG. 7. In this example of the multiplexing/de-multiplexing entity, the VoIP packet arrival pattern is measured with a predefined granularity and the multiplexing is based on this pattern. When a new aggregated frame is created, the multiplexing timer value is defined based on the detected pattern.

Figure 10:
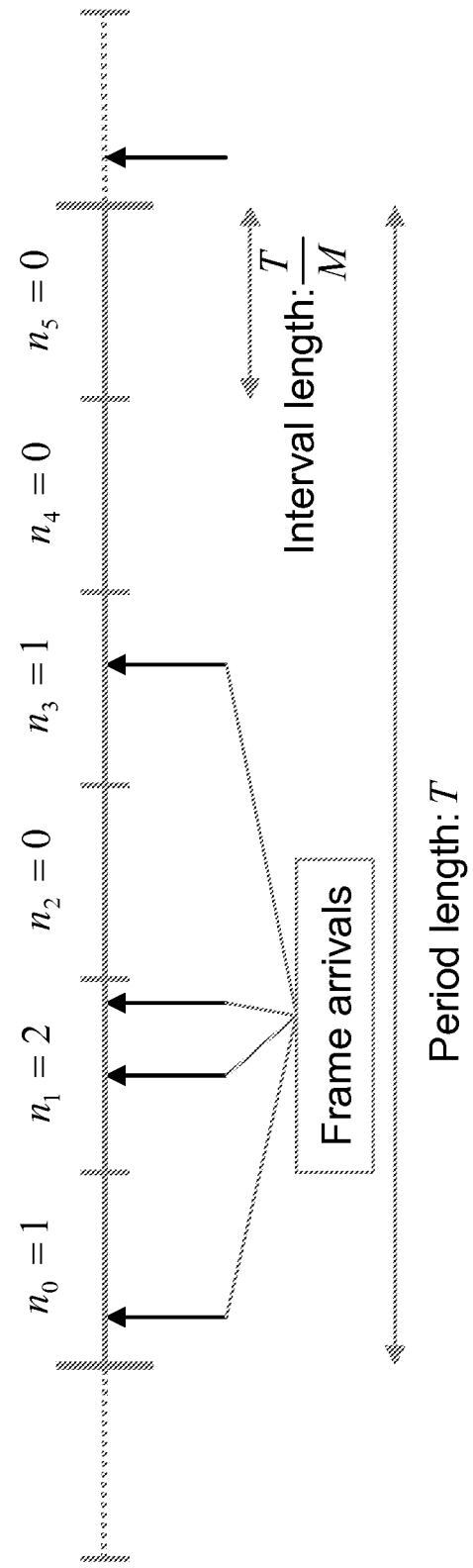
FIG. 10 is an overview illustrating packet pattern detection with M=6 according to an aspect of the present invention.

First, the arrival pattern detection is performed. The basic time period, that is, the VoIP packet inter-arrival time, T, is divided into M (e.g., M=20) equal intervals, and the number of packet arrivals $n_i$ in each of these intervals (i=0, 1, . . . , M−1) is measured and updated in every time period. FIG. 10 illustrates an example of the packet pattern detection with M=6. M is a parameter of the algorithm. Large values of M leads to fine granularity and higher efficiency but requires higher computational resources as well. The value of this parameter can be defined adaptively based on the number of active connections. The sum of $n_i$ gives the number of active connections N*. Other parameters of the algorithm are $t_{max}$, the maximum allowed waiting time of a VoIP packet in the multiplexing buffer ($t_{max}<T$), and $n_{max}$, the maximum number of packets in the multiplex which is defined based on the MTU size. If either the number of VoIP packets in the buffer exceeds $n_{max}$ or the waiting time of the first packet reaches $t_{max}$, the aggregated frame is sent out.

The average multiplexing delay achieved by the standard method (without adaptive parameter tuning) can be reduced by forecasting future packet arrivals based on the detected VoIP packet pattern. The method is based on the plausible assumption that the probability that $n_i$ changes in time T is low, since the average length of ON and OFF states of an active VoIP user is typically much larger than T, and the packets corresponding to a certain active VoIP connection in ON state are expected to arrive periodically, always in the same interval i in each period (typical jitter is assumed to be less than T/M). Thus, in the next period, the same number of packets is expected to arrive in each interval i as before. In particular, if there were no detected packet arrivals in some intervals ($n_i$=0) then there are no expected packet arrivals in these intervals of the next period. This prediction can be used to send out the multiplex before the default timer is exceeded but after the arrival of the last expected VoIP packet.

The main idea of this example is that in case there are no more packet arrivals predicted up to the time when the default timer is exceeded, then the multiplex can be sent out without waiting further for incoming VoIP packets, thus reducing the average multiplexing delay without decreasing the expected number of VoIP packets in the multiplex. The silence frames generated during the connections are in OFF state and should be handled separately in similar way as the voice frames sent during the ON period.

Figure 11:
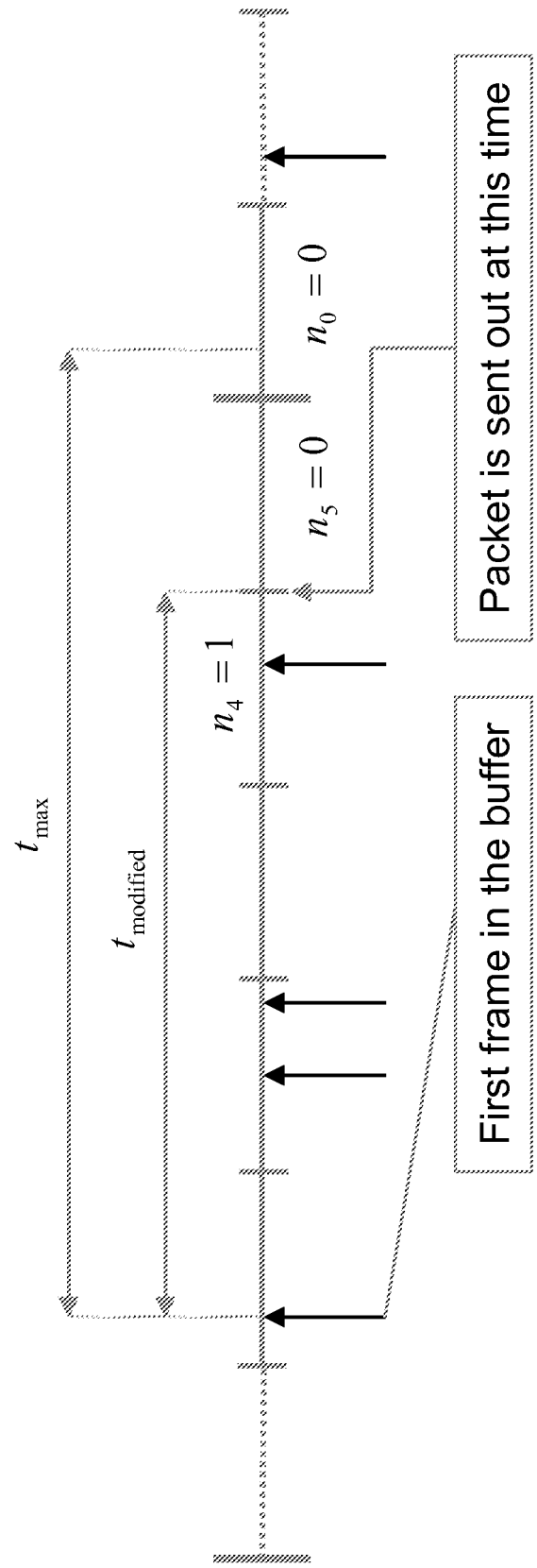
FIG. 11 is an overview illustrating a mechanism of the algorithm with M=6 according to an aspect of the present invention.

As the first packet arrives at the multiplexing buffer and the creation of the aggregated frame is started, the timer is set to a value ($t_{modified}$) which is less than or equal to $t_{max}$ depending on the detected packet arrival pattern. First, it is determined in which interval i a timer set to $t_{max}$ would expire. If the expected number of packet arrivals in this interval ($n_i$) is non-zero, then the maximum waiting time is not modified ($t_{modified}=t_{max}$). Otherwise, if $n_i=0$, then the previous interval i=i−1 (mod M) is considered and it is checked whether there are VoIP packets expected to arrive in this interval. This process is repeated until a non-empty interval is found, where $n_i>0$. $t_{modified}$ is then defined as the time up to the end of this interval. This is illustrated in FIG. 11, which shows the mechanism of the algorithm with M=6. After $t_{modified}$ is determined, a standard multiplexer with a maximum waiting time $t_{modified}$ and maximum number of VoIP packets $n_{max}$ is used, i.e., the packet is sent out either if the number of VoIP packets in the multiplex reaches $n_{max}$ or if the timer reaches $t_{modified}$.

This method is most efficient when the number of active connections N* is low compared to $n_{max}T/t_{max}$ since in this case the probability of an interval being empty ($n_i=0$) is higher. It is noted that in order to ensure that the method functions correctly, the parameter $t_{max}$ should preferably be less than T−T/M.

Due to the changing number of active connections, the values of $n_i$ change in time, therefore it is possible that in an interval where no packet arrivals are predicted initially ($n_i=0$) a packet will arrive, which may lead to a slight increase in the average number of transmitted packets per time. However, in simulations this increase is found to be insignificant.

The de-multiplexer at the peering entity just strips down the transport frame and multiplexing headers and delivers each VoIP packet to the corresponding destination.

Figure 12:
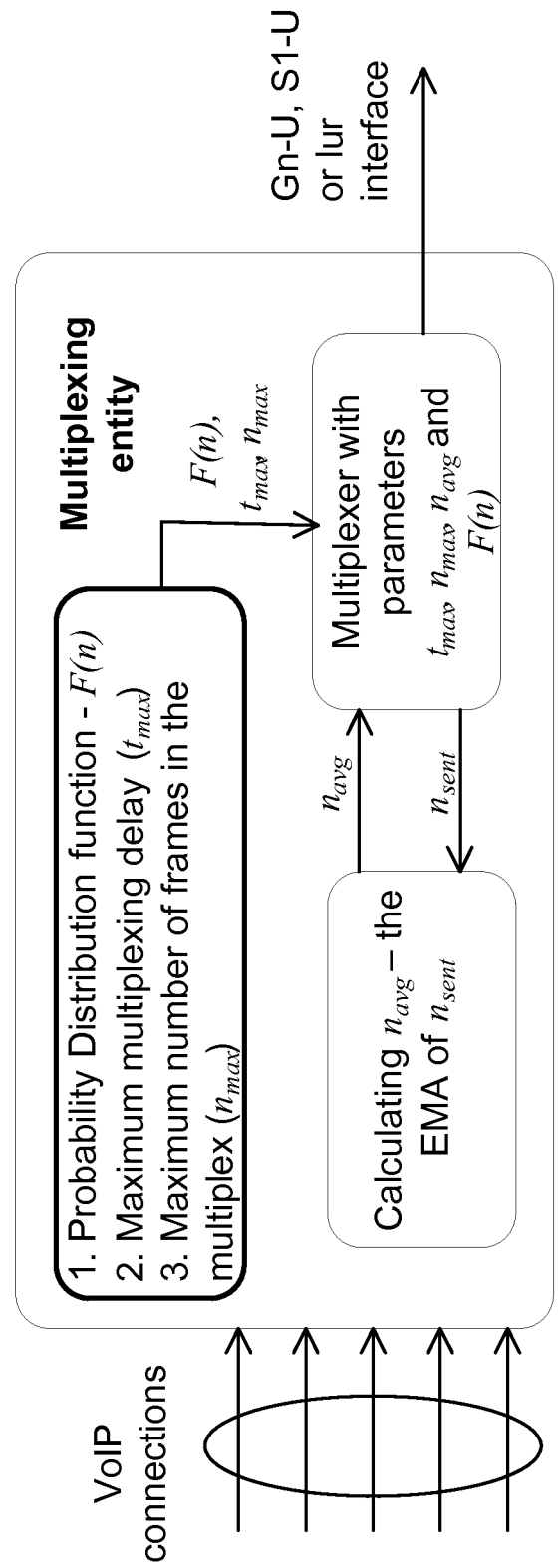
FIG. 12 is a diagram illustrating an example of a multiplexing entity according to an aspect of the present invention.
Figure 13:
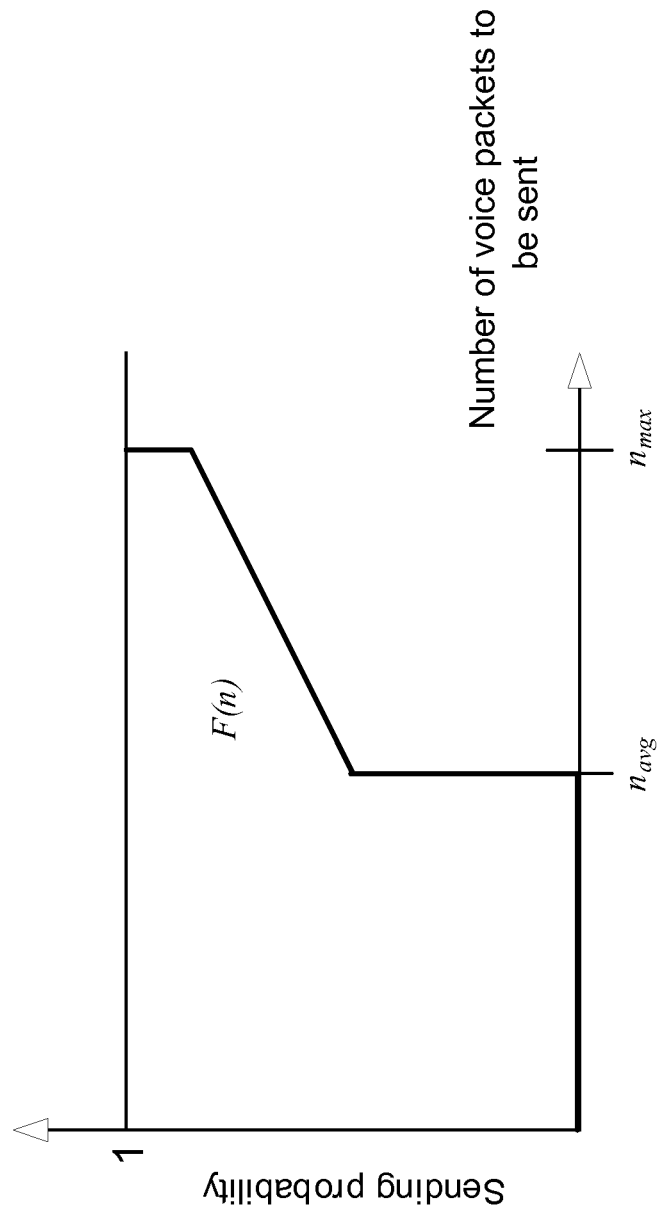
FIG. 13 is a diagram showing a probability function for determining sending instant according to an aspect of the present invention.

FIG. 12 shows another example of a multiplexer of a multiplexing/de-multiplexing entity according to an embodiment of the present invention. Here, the de-multiplexing entity is implemented according to FIG. 7. In this example of the multiplexing/de-multiplexing entity, the multiplexer measures the average number of voice packets ($n_{avg}$) sent in the aggregated transport frames using the exponential moving average (EMA) method. The sending instant of the aggregated frame is determined based on a probability distribution function after the number of voice packets to be multiplexed reaches $n_{avg}$. At the arrival of each further voice packets a decision is made on the sending of the aggregated frame based on the probability distribution function F(n). FIG. 13 shows a diagram of a probability function F(n) for determining the sending instant. Other parameters of the algorithm are $t_{max}$, the maximum allowed waiting time of a VoIP packet in the multiplexing buffer and $n_{max}$, the maximum number of packets in the multiplex defined based on the MTU size. If either the number of VoIP packets in the buffer exceeds $n_{max}$ or the waiting time of the first packet reaches $t_{max}$, the aggregated frame is sent out.

Upon the sending of a transport frame, the value of $n_{avg}$ is updated with the number of voice packets ($n_{sent}$) sent in the transport frame and the new value of $n_{avg}$ is propagated to the multiplexer. The probability distribution function used to determine the instant of the sending can be arbitrary, however, a function that sends the multiplex often just after reaching $n_{avg}$ would shift $n_{avg}$ towards 0.

The de-multiplexer at the peering entity just strips down the transport frame and multiplexing headers and delivers each VoIP packet to the corresponding destination.

Figure 14:
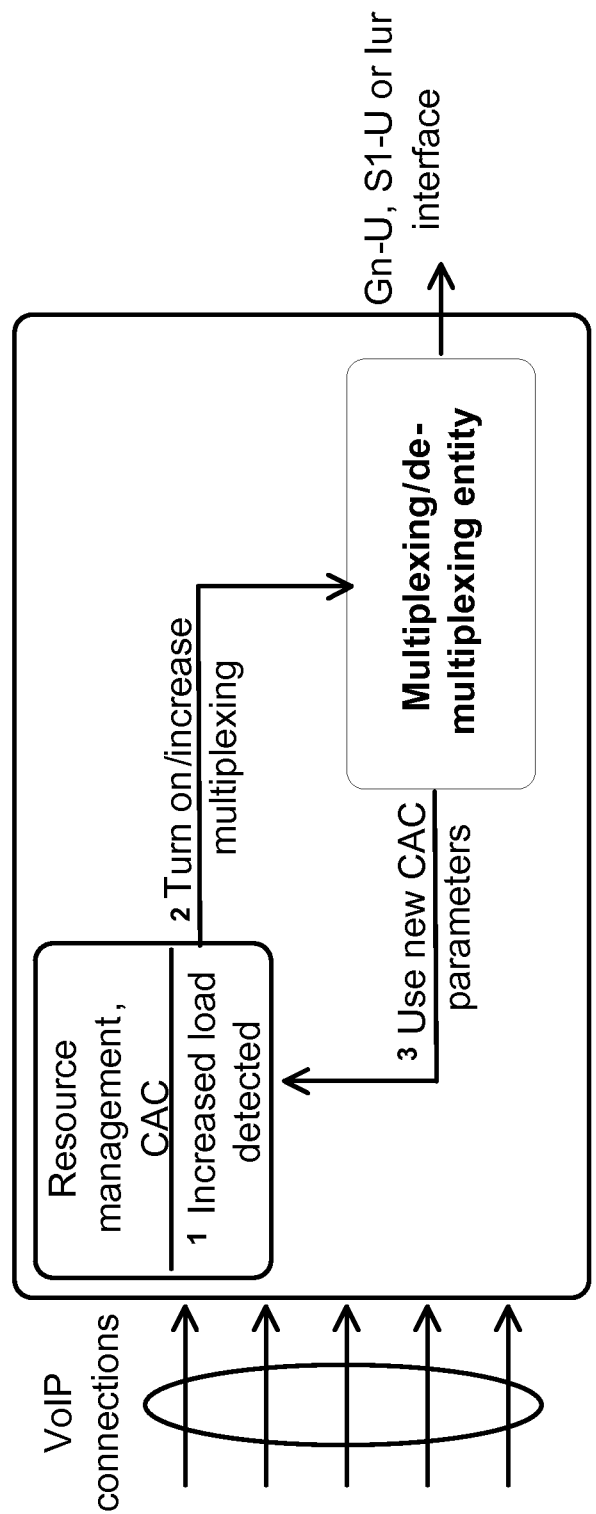
FIG. 14 is an overview illustrating a load driven application of the multiplexing/de-multiplexing entity according to an aspect of the present invention.

Additionally or alternatively to the examples as described above, the adaptive multiplexing/de-multiplexing entity can be applied as a simple means to handle temporarily increased traffic demand/load. In case the resource management is detecting increased amount of VoIP traffic at a given I-HSPA BTS or eNB, a command is sent to the multiplexing/de-multiplexing entity to turn on or to increase multiplexing. FIG. 14 is an overview of a load driven application of the multiplexing/de-multiplexing entity. When the multiplexing entity is turned on or the new multiplexing parameters are configured, an acknowledgement is sent to CAC in order to use CAC parameters that reflect that the multiplexing is on or the multiplexing factor increased. With these parameters the CAC will admit more VoIP connections to the system than before.

Figure 15:
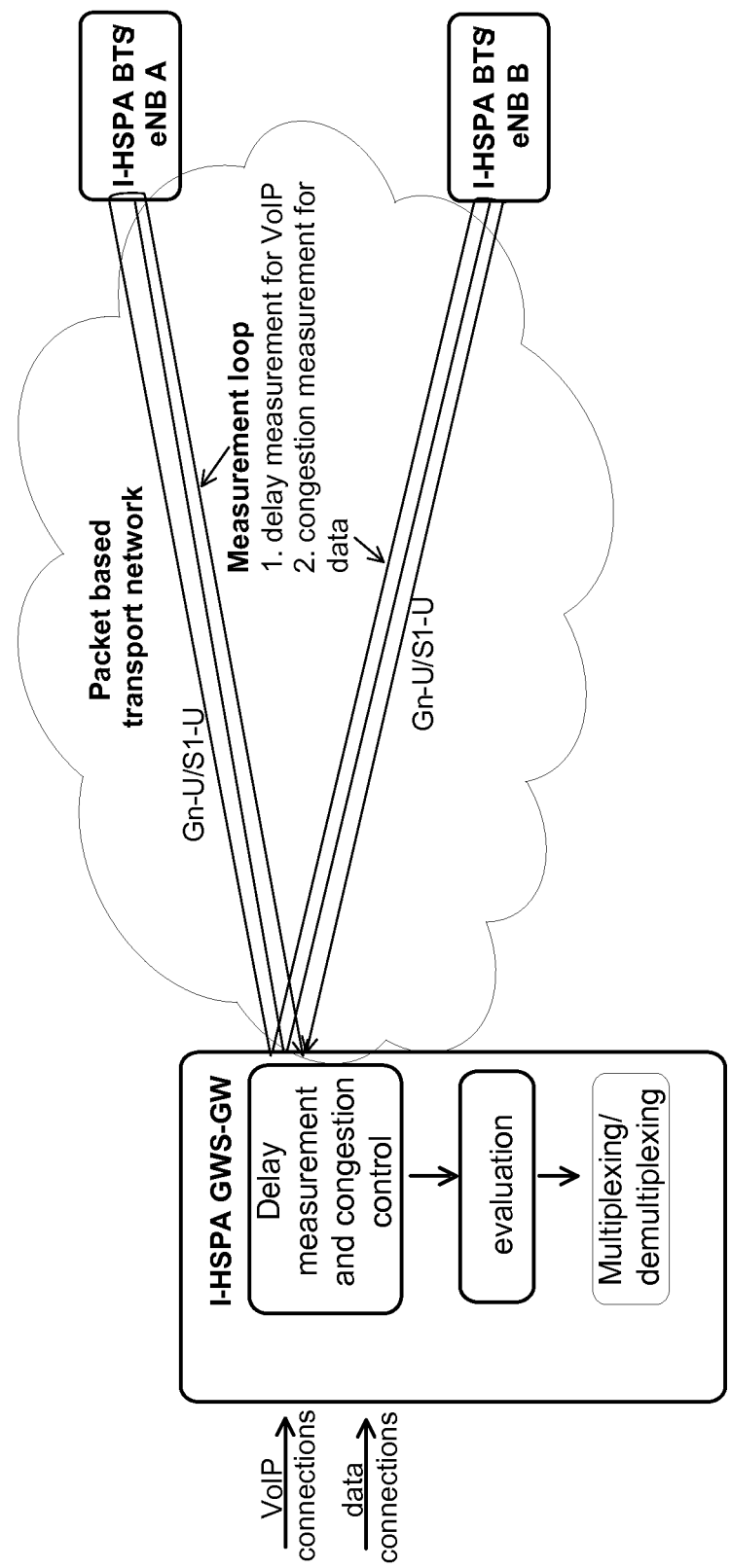
FIG. 15 is an overview illustrating multiplexing/de-multiplexing based on delay measurement and congestion detection according to an aspect of the present invention.

A still further possible alternative is to implement a delay and congestion measurement entity in the I-HSPA GW or S-GW that measures the delay of the VoIP connections towards each I-HSPA BTS or eNB and at the same time performs congestion detection for the data traffic. FIG. 15 shows an overview illustrating multiplexing/de-multiplexing based on delay measurement and congestion detection according to an aspect of the present invention. For example, the BFD protocol could be used for this purpose. One BFD session should be assigned to VoIP traffic, while the second session should be assigned to low and medium priority traffic. By monitoring the difference in the measurement results, the network link quality can be assessed much more precisely without knowing any absolute details about the transport network. In case congestion is detected towards one I-HSPA BTS or eNB, the evaluation entity calculates the bandwidth gain and estimates the end-to-end delay of VoIP connections in case the multiplexing is turned on. If the estimated delay is not worse than the measured value (or it is below a predefined maximum allowed value) and the bandwidth gain is above a predefined threshold, the multiplexing is turned on. Similarly, multiplexing of VoIP connections of those I-HSPA BTSs or eNBs that are sharing common transport links with the one for which congestion was detected is evaluated and in case the result is positive, multiplexing is turned on, thus significant bandwidth gain can be achieved. This would require knowledge on the transport capacity at the evaluation entity.

In the following, an operation of the multiplexer according to an example of the embodiment of the present invention will be described with reference to FIGS. 16 and 17.

Figure 16:
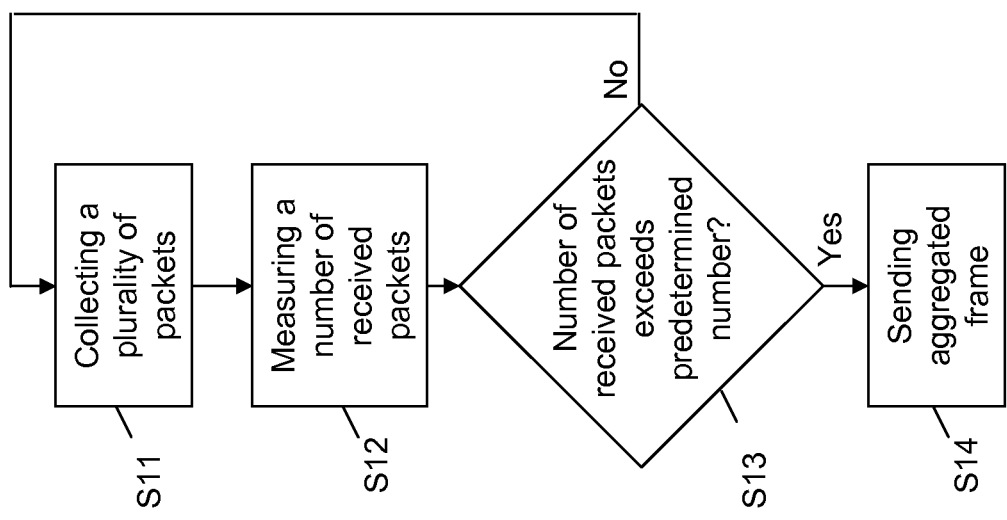
FIG. 16 is a flow chart of the operation of a multiplexer according to an example of the embodiment of the present invention.
Figure 17:
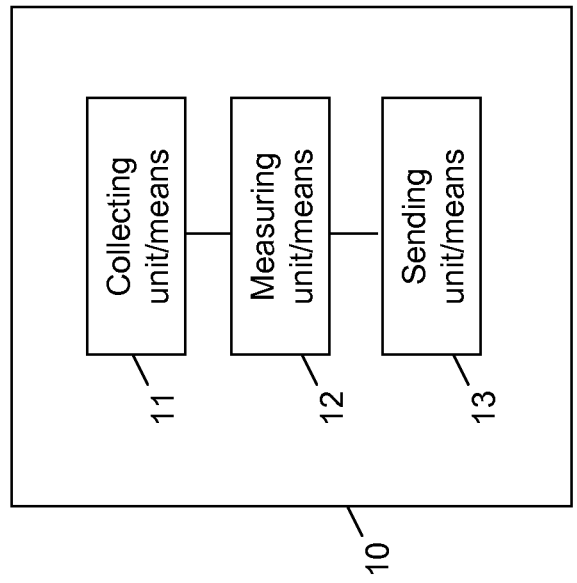
FIG. 17 is a functional block diagram of a multiplexer according to an example of the embodiment of the present invention.

FIG. 16 is a flow chart of the operation of the multiplexer according to an example of the embodiment of the present invention and FIG. 17 is a functional block diagram of the multiplexer according to an example of the embodiment of the present invention.

First, in step S11, the collecting unit 11 collects a plurality of packets, like e.g. VoIP packets. Then, in step S12, the measuring unit 12 measures the number of packets collected by the collecting unit 11 and in step S13 it is determined whether the number of collected packets exceeds a predetermined value. If it is detected in step S13 that the number of collected packets exceeds the predetermined value, the sending unit 13 sends the aggregated frame including the multiplexed packets in step S14. If it is detected in step S13 that the number of collected packets does not exceed the predetermined value, the process returns to step S11.

In the following, an operation of the multiplexer according to another example of the embodiment of the present invention will be described with reference to FIGS. 18 and 19.

Figure 18:
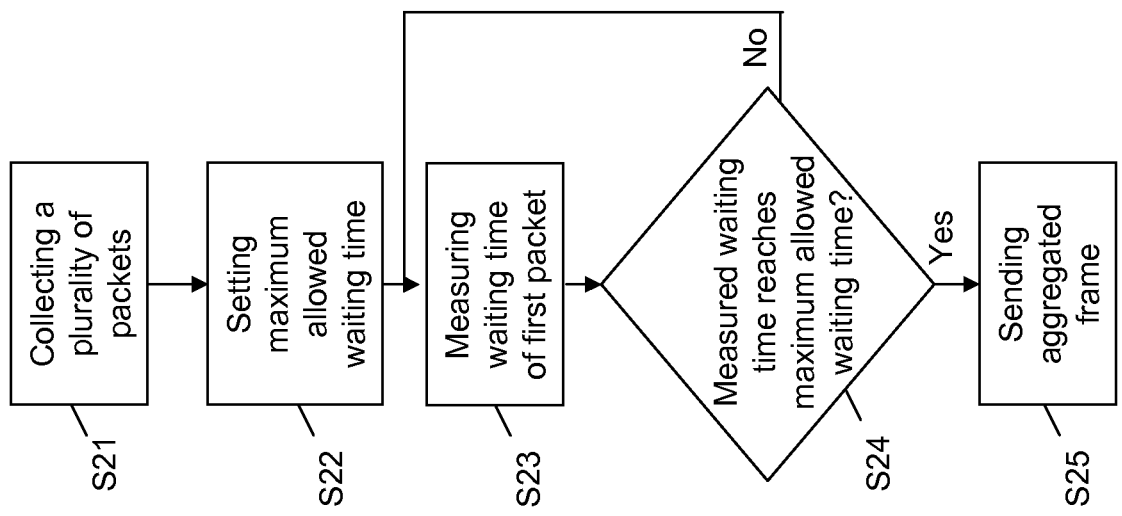
FIG. 18 is a flow chart of the operation of a multiplexer according to another example of the embodiment of the present invention.
Figure 19:
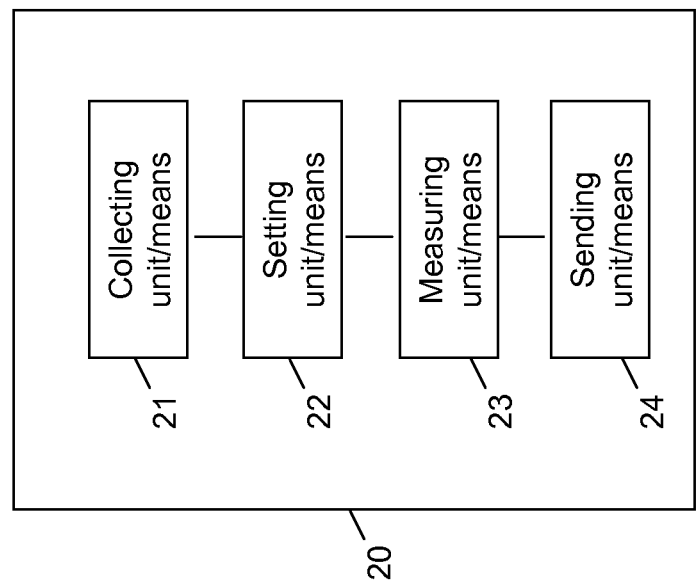
FIG. 19 is a functional block diagram of a multiplexer according to another example of the embodiment of the present invention.

FIG. 18 is a flow chart of the operation of the multiplexer according to another example of the embodiment of the present invention and FIG. 19 is a functional block diagram of the multiplexer according to another example of the embodiment of the present invention.

First, in step S21, a collecting unit 21 collects a plurality of packets which are to be multiplexed into an aggregated frame. Then, in step S22, a setting unit 22 sets a maximum allowed waiting time of a packet in a multiplexing buffer and a measuring unit 23 measures a waiting time of the first packet in the multiplexing packet in step S23. Then, in step S24, it is determined whether the measured waiting time of the first packet reaches the maximum allowed waiting time set by the setting unit 22. If it is determined that the measured waiting time of the first packet reaches the maximum allowed waiting time in step S24, a sending unit 24 sends the aggregated frame including the collected packets in step S25. If it is determined that the measured waiting time of the first packet does not reach the maximum allowed waiting time in step S24, the process returns to step S23.

In the following, an operation of the multiplexer according to still another example of the embodiment of the present invention will be described with reference to FIGS. 20 and 21.

Figure 20:
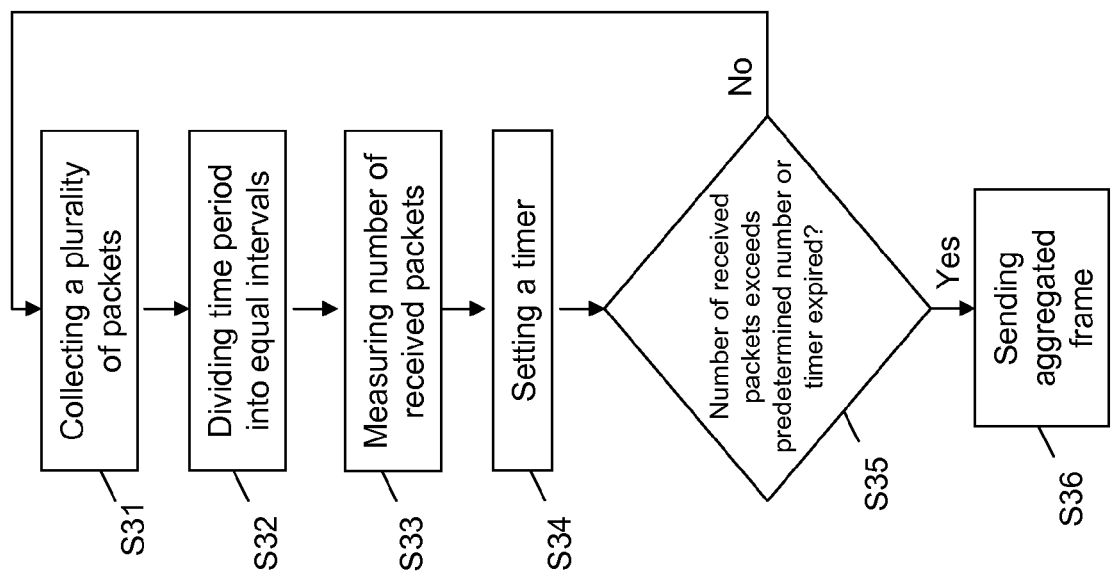
FIG. 20 is a flow chart of the operation of a multiplexer according to still another example of the embodiment of the present invention.
Figure 21:
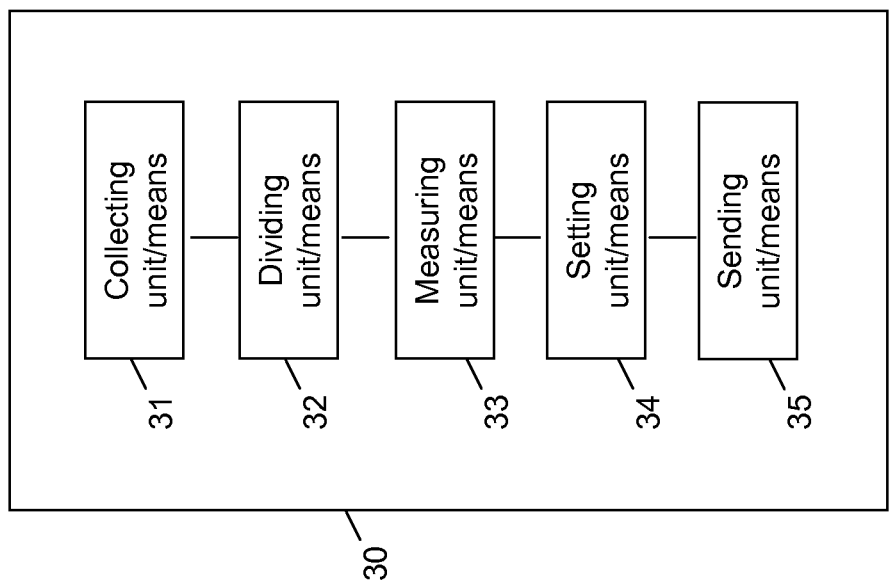
FIG. 21 is a functional block diagram of a multiplexer according to still another example of the embodiment of the present invention.

FIG. 20 is a flow chart of the operation of the multiplexer according to still another example of the embodiment of the present invention and FIG. 21 is a functional block diagram of the multiplexer according to still another example of the embodiment of the present invention.

First, in step S31, the collecting unit 31 collects a plurality of packets. Then, a dividing unit 32 divides a predetermined time period, which is the packet inter-arrival time, into a plurality of equal intervals in step S32. Further, a measuring unit 33 measures the number of packets collected by the collecting unit 31 in step S33, and in step 34, a setting unit 34 sets a timer at the arrival of the first packet in the collecting unit 31. Then, in step S35 it is determined whether the number of collected packets exceeds a predetermined value or the timer has expired. If it is determined in step S35 that the number of collected packets exceeds a predetermined value or the timer has expired, the sending unit 36 sends the aggregated frame including the collected packets in step S36. If it is determined in step S35 that the number of collected packets does not exceed a predetermined value and the timer has not expired, the process returns to step S31.

In the following, an operation of a gateway including a multiplexer according to an example of the embodiment of the present invention will be described with reference to FIG. 22.

Figure 22:
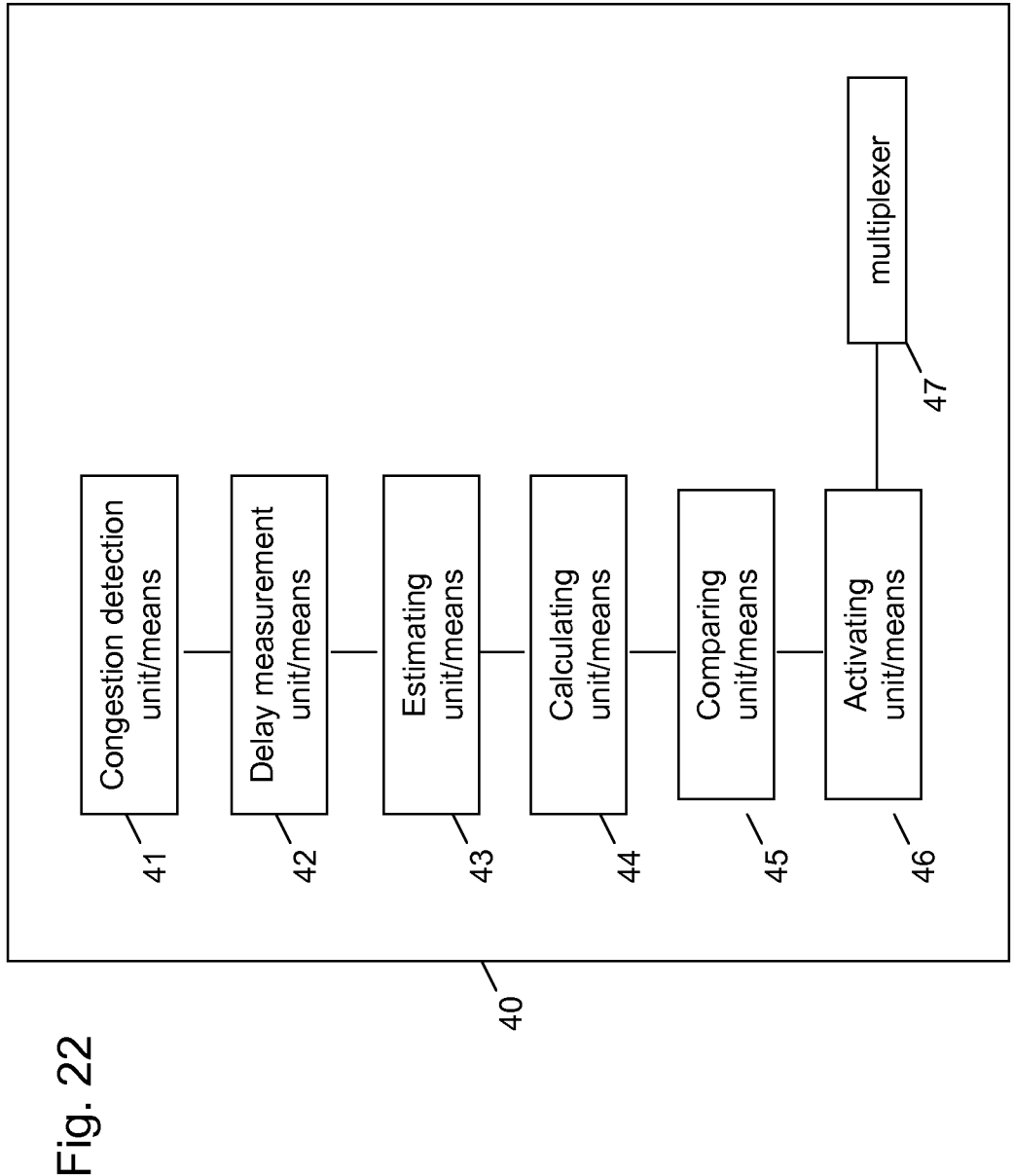
FIG. 22 is a functional block diagram of a gateway including a multiplexer according to an example of the embodiment of the present invention.

FIG. 22 is a functional block diagram of a gateway including a multiplexer according to an example of the embodiment of the present invention.

The gateway 40 may be a I-HSPA GW or a S-GW and comprises a congestion detecting unit 41 that performs a congestion detection for the traffic data. Further, the gateway comprises a delay measurement unit 42 which measures the delay of the VoIP connections towards each I-HSPA BTS or eNB. Moreover, the gateway comprises an estimating unit 43 that estimates an end-to-end delay of the VoIP connections and a calculating unit 44 that calculates the bandwidth gain in case the multiplexing is turned on. Then, a comparing unit 45 compares the estimated delay with the measured delay or a predetermined threshold and also compares the calculated bandwidth gain with a predetermined threshold. If the estimated delay is not worse than the measured value or is below a predetermined maximum allowed threshold and the bandwidth gain is above the predetermined threshold, an activation unit 46 turns on the multiplexer 47 so as to perform the multiplexing operation according to one of the example as described above.

Although the embodiments of the present invention are described with reference to mobile communication networks, in particular, I-HSPA and LTE, it is noted that the present invention is not limited to mobile communication networks, but that the present invention is also applicable any kind of wired packet based networks.

Further, it is noted that the solutions as described above are not restricted to speech or to congestion situation. Moreover, the embodiments and examples of the embodiments as described above may be combined in a suitable manner.

In summary, the invention proposes several alternative solutions starting from simple ones that are not requiring cross layer functionality to more enhanced ones with measurement loops. There are several known solutions but none with reasonable adaptive parameterization. The benefit of the adaptive solution is that based on simple measures the multiplexing is configuring itself to the actual situation, thus there is no need for parameter configuration or for predefined defaults that are not suitable in each situation the system might encounter.

In the foregoing exemplary description of the multiplexing/de-multiplexing entities and the gateway, only the units that are relevant for understanding the principles of the invention have been described using functional blocks. The multiplexing/de-multiplexing entity and gateway may comprise further units that are necessary for their operation as multiplexing/de-multiplexing entity, respectively. However, a description of these units is omitted in this specification. The arrangement of the functional blocks of the devices is not construed to limit the invention, and the functions may be performed by one block or further split into sub-blocks.

For the purpose of the present invention as described herein above, it should be noted that method steps likely to be implemented as software code portions and being run using a processor at a network control element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above, UE, eNode-B etc. as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses and gateway, or any one of their respective units/means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

It is noted that the embodiments and general and specific examples described above are provided for illustrative purposes only and are in no way intended that the present invention is restricted thereto. Rather, it is the intention that all variations and modifications be included which fall within the scope of the appended claims.

The invention claimed is:

1. A method comprising:
collecting, at a gateway, a plurality of packets to be multiplexed by a multiplexer in an aggregated frame,
measuring, at the gateway, a number of received packets within a predetermined time period,
if the number of received packets reaches a predetermined value,
sending, at the gateway, the aggregated frame including the collected packets,
detecting, at the gateway, a congestion,
measuring, at the gateway, a delay of a connection between the gateway and a base station,
estimating, at the gateway, if congestion is detected, a delay of the connection between the gateway and the base station when the multiplexer is turned on,
calculating, at the gateway, if congestion is detected, a bandwidth gain,
comparing, at the gateway, the estimated delay with the measured delay or with a first predetermined threshold and to compare the bandwidth gain with a second predetermined threshold, and
activating the multiplexer, if the estimated delay is lower than the measured delay or the first predetermined threshold and the bandwidth gain is above the second predetermined threshold.

2. A method comprising:
collecting, at a gateway, a plurality of packets to be multiplexed by a multiplexer in an aggregated frame,
setting, at the gateway, a maximum allowed waiting time of a packet in a multiplexing buffer,
measuring, at the gateway, a number of received packets within a predetermined time period and a waiting time of a first packet in the multiplexing buffer,
if the number of received packets reaches a predetermined value or if the waiting time of the first packet reaches the maximum allowed waiting time,
sending, at the gateway, the aggregated frame including the collected packets,
detecting, at the gateway, a congestion,
measuring, at the gateway, a delay of a connection between the gateway and a base station,
estimating, at the gateway, if congestion is detected, a delay of the connection between the gateway and the base station when the multiplexer is turned on,
calculating, at the gateway, if congestion is detected, a bandwidth gain,
comparing, at the gateway, the estimated delay with the measured delay or with a first predetermined threshold and to compare the bandwidth gain with a second predetermined threshold, and
activating the multiplexer, if the estimated delay is lower than the measured delay or the first predetermined threshold and the bandwidth gain is above the second predetermined threshold.

3. A method according to claim 2, further comprising:
detecting an average number of multiplexed packets sent in an aggregated frame,
deciding, upon arrival of each further packet after the number of packets to be multiplexed reaches the measured average number, whether to send the aggregated frame based on a probability distribution function.

4. A method, comprising:
collecting, at a gateway, a plurality of packets to be multiplexed by a multiplexer in an aggregated frame,
dividing, at the gateway, a predetermined time period into a plurality of equal intervals,
measuring, at the gateway, a number of received packets within each of the plurality of intervals,
when the measured number of received packets exceeds a predetermined value,
sending, at the gateway, the aggregated frame including the collected packets,
detecting, at the gateway, a congestion,
measuring, at the gateway, a delay of a connection between the gateway and a base station,
estimating, at the gateway, if congestion is detected, a delay of the connection between the gateway and the base station when the multiplexer is turned on,
calculating, at the gateway, if congestion is detected, a bandwidth gain,
comparing, at the gateway, the estimated delay with the measured delay or with a first predetermined threshold and to compare the bandwidth gain with a second predetermined threshold, and
activating the multiplexer, if the estimated delay is lower than the measured delay or the first predetermined threshold and the bandwidth gain is above the second predetermined threshold.

5. A method according to claim 4, further comprising:
setting a timer at the arrival of the first packet to a predetermined value, and
when the measured number of received packets exceeds a predetermined value or the timer expires, sending the aggregated frame including the collected packets.

6. The method according to claim 5, further comprising:
predicting a number of packets to be received within each of a plurality of intervals of a next predetermined time period based on the measured number of received packets within each of the plurality of intervals in the previous predetermined time period,
determining in which of the plurality of intervals of the next predetermined period the timer expires,
detecting whether the predicted number of packets to be received in the determined interval is zero, wherein
if the predicted number of packets is zero,
repeating the detecting for the interval previous to the determined interval until an interval is determined in which the predicted number of packets to be received is other than zero, and then defining the timer as the time up to the end of the interval in which the predicted number of packets is other than zero.

7. An apparatus comprising:
a multiplexer comprising a collecting unit configured to collect a plurality of packets to be multiplexed in an aggregated frame,
a measuring unit configured to measure a number of received packets within a predetermined time period, and
a sending unit configured to send, if the number of received packets reaches a predetermined value, the aggregated frame including the collected packets,
wherein the apparatus is configured to
detect a congestion via a congestion detecting unit,
measure a delay of a connection between the gateway and a base station via a delay measurement unit,
estimate, if congestion is detected, a delay of the connection between the gateway and the base station when the multiplexer is turned on via an estimating unit,
calculate, if congestion is detected, a bandwidth gain via a calculating unit,
compare the estimated delay with the measured delay or with a first predetermined threshold and to compare the bandwidth gain with a second predetermined threshold via a comparing unit, and
activate the multiplexer, if the estimated delay is lower than the measured delay or the first predetermined threshold and the bandwidth gain is above the second predetermined threshold via an activating unit.

8. An apparatus comprising:
a multiplexer comprising
a collecting unit configured to collect a plurality of packets to be multiplexed in an aggregated frame,
a setting unit configured to set a maximum allowed waiting time of a packet in a multiplexing buffer,
a measuring unit configured to measure a number of received packets within a predetermined time period and a waiting time of a first packet in the multiplexing buffer, and
a sending unit configured to send, if the number of received packets reaches a predetermined value or if the waiting time of the first packet reaches the maximum allowed waiting time, the aggregated frame including the collected packets,
wherein the apparatus is configured to
detect a congestion via a congestion detecting unit,
measure a delay of a connection between the gateway and a base station via a delay measurement unit,
estimate, if congestion is detected, a delay of the connection between the gateway and the base station when the multiplexer is turned on via an estimating unit,
calculate, if congestion is detected, a bandwidth gain via a calculating unit,
compare the estimated delay with the measured delay or with a first predetermined threshold and to compare the bandwidth gain with a second predetermined threshold via a comparing unit, and
activate the multiplexer, if the estimated delay is lower than the measured delay or the first predetermined threshold and the bandwidth gain is above the second predetermined threshold via an activating unit.

9. An apparatus according to claim 8, further comprising:
a detecting unit configured to detect an average number of multiplexed packets sent in an aggregated frame,
a deciding unit configured to decide, upon arrival of each further packet after the number of packets to be multiplexed reaches the measured average number, whether to send the aggregated frame based on a probability distribution function.

10. An apparatus comprising:
a multiplexer comprising a collecting unit configured to collect a plurality of packets to be multiplexed in an aggregated frame,
a dividing unit configured to divide a predetermined time period into a plurality of equal intervals,
a measuring unit configured to measure a number of received packets within each of the plurality of intervals, and
a sending unit configured to send, when the measured number of received packets exceeds a predetermined value, the aggregated frame including the collected packets,
wherein the apparatus is configured to
detect a congestion via a congestion detecting unit,
measure a delay of a connection between the gateway and a base station via a delay measurement unit,
estimate, if congestion is detected, a delay of the connection between the gateway and the base station when the multiplexer is turned on via an estimating unit,
calculate, if congestion is detected, a bandwidth gain via a calculating unit,
compare the estimated delay with the measured delay or with a first predetermined threshold and to compare the bandwidth gain with a second predetermined threshold via a comparing unit, and
activate the multiplexer, if the estimated delay is lower than the measured delay or the first predetermined threshold and the bandwidth gain is above the second predetermined threshold via an activating unit.

11. An apparatus according to claim 10, further comprising:
a setting unit configured to set a timer at the arrival of the first packet to a predetermined value,
wherein the sending unit is further configured to send the aggregated frame including the collected packets, when the measured number of received packets exceeds a predetermined value or the timer expires.

12. An apparatus according to claim 11, further comprising:
a predicting unit configured to predict a number of packets to be received within each of a plurality of intervals of a next predetermined time period based on the measured number of received packets within each of the plurality of intervals in the previous predetermined time period,
a determining unit configured to determine in which of the plurality of intervals of the next predetermined period the timer expires,
a detecting unit configured to detect whether the predicted number of packets to be received in the determined interval is zero,
wherein if the predicted number of packets is zero, the operation of the detecting unit is repeated for the interval previous to the determined interval until an interval is determined in which the predicted number of packets to be received is other than zero, and
a defining unit configured to define the timer as the time up to the end of the interval in which the predicted number of packets is other than zero.

13. A non-transitory computer-readable medium embodied with a computer program product including a program for a processing device, comprising software code portions for performing the steps of claim 1 when the program is run on the processing device.

14. A non-transitory computer-readable medium embodied with the computer program product according to claim 13, wherein the software code portions are stored.

15. A non-transitory computer-readable medium embodied with the computer program product according to claim 13, wherein the program is directly loadable into an internal memory of the processing device.

16. An apparatus comprising:
multiplexing means for multiplexing packets, the multiplexing means comprising
collecting means for collecting a plurality of packets to be multiplexed in an aggregated frame,
measuring means for measuring a number of received packets within a predetermined time period, and
sending means for sending, if the number of received packets reaches a predetermined value, the aggregated frame including the collected packets,
wherein the apparatus further comprises
detecting means for detecting a congestion,
delay measurement means for measuring a delay of a connection between the gateway and a base station,
estimating means for estimating, if congestion is detected, a delay of the connection between the gateway and the base station when the multiplexer is turned on,
calculating means for calculating, if congestion is detected, a bandwidth gain,
comparing means for comparing the estimated delay with the measured delay or with a first predetermined threshold and to compare the bandwidth gain with a second predetermined threshold, and
activating means for activating the multiplexer, if the estimated delay is lower than the measured delay or the first predetermined threshold and the bandwidth gain is above the second predetermined threshold.

17. An apparatus comprising:
multiplexing means for multiplexing packets, the multiplexing means comprising
collecting means for collecting a plurality of packets to be multiplexed in an aggregated frame,
setting means for setting a maximum allowed waiting time of a packet in a multiplexing buffer,
measuring means for measuring a number of received packets within a predetermined time period and a waiting time of a first packet in the multiplexing buffer, and
sending means for sending, if the number of received packets reaches a predetermined value or if the waiting time of the first packet reaches the maximum allowed waiting time, the aggregated frame including the collected packets,
wherein the apparatus further comprises
detecting means for detecting a congestion,
delay measurement s measuring a delay of a connection between the gateway and a base station,
estimating means for estimating, if congestion is detected, a delay of the connection between the gateway and the base station when the multiplexer is turned on,
calculating means for calculating, if congestion is detected, a bandwidth gain,
comparing means for comparing the estimated delay with the measured delay or with a first predetermined threshold and to compare the bandwidth gain with a second predetermined threshold, and
activating means for activating the multiplexer, if the estimated delay is lower than the measured delay or the first predetermined threshold and the bandwidth gain is above the second predetermined threshold.

18. An apparatus comprising:
multiplexing means for multiplexing packets, the multiplexing means comprising
collecting means for collecting a plurality of packets to be multiplexed in an aggregated frame,
dividing means for dividing a predetermined time period into a plurality of equal intervals,
measuring means for measuring a number of received packets within each of the plurality of intervals, and
sending means for sending, when the measured number of received packets exceeds a predetermined value, the aggregated frame including the collected packets,
wherein the apparatus further comprises
detecting means for detecting a congestion via a congestion,
delay measurement means for measuring a delay of a connection between the gateway and a base station,
estimating means for estimating, if congestion is detected, a delay of the connection between the gateway and the base station when the multiplexer is turned on,
calculating means for calculating, if congestion is detected, a bandwidth gain,
comparing means for comparing the estimated delay with the measured delay or with a first predetermined threshold and to compare the bandwidth gain with a second predetermined threshold, and
activating means for activating multiplexer, if the estimated delay is lower than the measured delay or the first predetermined threshold and the bandwidth gain is above the second predetermined threshold.

* * * * *